(12) United States Patent
Nanjundiah et al.

(10) Patent No.: US 6,643,119 B2
(45) Date of Patent: Nov. 4, 2003

(54) ELECTROCHEMICAL DOUBLE LAYER CAPACITOR HAVING CARBON POWDER ELECTRODES

(75) Inventors: Chenniah Nanjundiah, San Diego, CA (US); Priya Bendale, San Diego, CA (US); Manuel R. Malay, San Diego, CA (US); John M. Dispennette, San Diego, CA (US); Earl Chaney, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/005,885

(22) Filed: Nov. 2, 2001

(65) Prior Publication Data

US 2003/0086238 A1 May 8, 2003

(51) Int. Cl.[7] .............................. H01G 9/00; H01G 2/10
(52) U.S. Cl. ...................... 361/502; 361/503; 361/517
(58) Field of Search ................... 361/502, 503, 361/508, 509, 510, 511, 512, 513, 516, 517, 518, 519, 520

(56) References Cited

U.S. PATENT DOCUMENTS

| | | | |
|---|---|---|---|
| 2,234,608 A | 3/1941 | Robinson et al. | |
| 2,800,616 A | 7/1957 | Becker | |
| 3,105,178 A | 9/1963 | Meyers | |
| 3,288,641 A | 11/1966 | Rightmire | |
| 3,536,963 A | 10/1970 | Boos et al. | |

(List continued on next page.)

FOREIGN PATENT DOCUMENTS

| | | |
|---|---|---|
| CA | 660854 | 4/1963 |
| CA | 849697 | 8/1970 |
| EP | 0112923 | 6/1983 |
| EP | 0134706 | 8/1984 |
| EP | 0207167 | 12/1985 |

(List continued on next page.)

OTHER PUBLICATIONS

U.S. patent application Ser. No. 09/569,679, Nanjundiah et al., filed May 12, 2000.

Cheng, et al.; "Preparation of Carbon Fibre Reinforced Aluminum Via Ultrasonic Liquid Infiltration Technique", Materials Science and Technology, 9, pp. 609–614 (Jul. 1993).

Foster, et al.; "New Highly Conductive Inorganic Electrolytes", *J. Electrochem. Soc.*, pp. 2682–2686, (Nov. 1988).

Farahmandi, et al.; "Optimization of Carbon Fibers Used in Electrochemical Capacitors for Electric Vehicle Applications", *The 36th Power Sources Conference, Cherry Hill, New Jersey*, pp. 23–26 (Jun. 6–9, 1994).

(List continued on next page.)

*Primary Examiner*—Anthony Dinkins
*Assistant Examiner*—Eric Thomas
(74) *Attorney, Agent, or Firm*—Foley & Lardner

(57) ABSTRACT

A method of making an electrode structure, the electrode structure and a double layer capacitor including the electrode structure, the method comprising the steps of: forming a plurality of electrodes, each having a current collector plate, a primary coating formed on each side of the collector plate, the primary coating including conducting carbon powder and a binder, and a secondary coating formed on each primary coating, the secondary coating including activated carbon powder, a solvent and a binder; positioning a respective separator between each electrodes while stacking the electrodes such that the respective separator is juxtaposed against respective secondary coatings of adjacent electrodes that electrically insulates the adjacent electrodes, whereby forming an electrode stack; and rolling the electrode stack into a cylindrical electrode structure.

18 Claims, 19 Drawing Sheets

U.S. PATENT DOCUMENTS

| | | |
|---|---|---|
| 3,617,387 A | 11/1971 | Grulke et al. |
| 3,648,126 A | 3/1972 | Boos et al. |
| 3,648,337 A | 3/1972 | Greskamp et al. |
| 3,652,902 A | 3/1972 | Hart et al. |
| 3,700,975 A | 10/1972 | Butherus et al. |
| 3,838,092 A | 9/1974 | Vogt et al. |
| 3,864,124 A | 2/1975 | Breton et al. |
| 3,935,029 A | 1/1976 | Baker et al. |
| 3,977,901 A | 8/1976 | Buzzelli |
| 4,096,277 A | 6/1978 | Gore |
| 4,153,661 A | 5/1979 | Ree et al. |
| 4,161,063 A | 7/1979 | Goebel et al. |
| 4,163,811 A | 8/1979 | Kohlmayr et al. |
| 4,187,390 A | 2/1980 | Gore |
| 4,278,525 A | 7/1981 | Gestaut |
| 4,313,084 A | 1/1982 | Hosokawa et al. |
| 4,317,789 A | 3/1982 | Groult et al. |
| 4,320,184 A | 3/1982 | Bernstein et al. |
| 4,320,185 A | 3/1982 | Bernstein et al. |
| 4,327,400 A | 4/1982 | Muranaka et al. |
| 4,337,140 A | 6/1982 | Solomon |
| 4,341,847 A | 7/1982 | Sammells |
| 4,354,958 A | 10/1982 | Solomon |
| 4,379,772 A | 4/1983 | Solomon et al. |
| 4,396,693 A | 8/1983 | Bernstein et al. |
| 4,438,481 A | 3/1984 | Phillips et al. |
| 4,440,835 A | 4/1984 | Vignaud |
| 4,457,953 A | 7/1984 | McIntyre et al. |
| 4,500,647 A | 2/1985 | Solomon |
| 4,556,618 A | 12/1985 | Shia |
| 4,562,511 A | 12/1985 | Nishino et al. |
| 4,576,861 A | 3/1986 | Kato |
| 4,594,758 A | 6/1986 | Watanabe et al. |
| 4,597,028 A | 6/1986 | Yoshida et al. |
| 4,622,611 A | 11/1986 | Bennett et al. |
| 4,664,683 A | 5/1987 | Degen et al. |
| 4,683,516 A | 7/1987 | Miller |
| 4,700,450 A | 10/1987 | Michel |
| 4,709,303 A | 11/1987 | Fujiwara et al. |
| 4,725,926 A | 2/1988 | Morimoto et al. |
| 4,725,927 A | 2/1988 | Morimoto et al. |
| 4,730,239 A | 3/1988 | Currie et al. |
| 4,737,889 A | 4/1988 | Nishino et al. |
| 4,760,494 A | 7/1988 | Crum |
| 4,804,592 A | 2/1989 | Vanderborgh et al. |
| 4,805,074 A | 2/1989 | Harakawa et al. |
| 4,853,305 A | 8/1989 | Anderman et al. |
| 4,862,328 A | 8/1989 | Morimoto et al. |
| 4,866,117 A | 9/1989 | Egashira et al. |
| 4,908,281 A | 3/1990 | O'Callaghan |
| 4,985,296 A | 1/1991 | Mortimer, Jr. |
| 4,987,518 A | 1/1991 | Dain |
| 5,012,385 A | 4/1991 | Kurabayashi et al. |
| 5,019,311 A | 5/1991 | Koslow |
| 5,065,286 A | 11/1991 | Kurabayashi et al. |
| 5,071,610 A | 12/1991 | Hagen et al. |
| 5,072,335 A | 12/1991 | Kurabayashi et al. |
| 5,072,336 A | 12/1991 | Kurabayashi et al. |
| 5,072,337 A | 12/1991 | Kurabayashi et al. |
| 5,080,963 A | 1/1992 | Tatarchuk et al. |
| 5,086,373 A | 2/1992 | Kurabayashi et al. |
| 5,096,663 A | 3/1992 | Tatarchuk |
| 5,099,398 A | 3/1992 | Kurabayashi et al. |
| 5,102,745 A | 4/1992 | Tatarchuk et al. |
| 5,103,379 A | 4/1992 | Kurabayashi et al. |
| 5,117,065 A | 5/1992 | Savage et al. |
| 5,121,301 A | 6/1992 | Kurabayashi et al. |
| 5,136,472 A | 8/1992 | Tsuchiya et al. |
| 5,142,451 A | 8/1992 | Kurabayashi et al. |
| 5,145,752 A | 9/1992 | Goldstein et al. |
| 5,147,539 A | 9/1992 | Hagen et al. |
| 5,147,722 A | 9/1992 | Koslow |
| 5,150,283 A | 9/1992 | Yoshida et al. |
| 5,158,722 A | 10/1992 | Ilic et al. |
| 5,172,307 A | 12/1992 | Tabuchi et al. |
| 5,190,833 A | 3/1993 | Goldstein et al. |
| 5,219,673 A | 6/1993 | Kaun |
| 5,227,960 A | 7/1993 | Kunishi et al. |
| 5,253,148 A | 10/1993 | Katsu |
| 5,277,729 A | 1/1994 | Endo et al. |
| 5,304,330 A | 4/1994 | Tatarchuk et al. |
| 5,318,862 A | 6/1994 | Liu et al. |
| 5,350,643 A | 9/1994 | Imahashi et al. |
| 5,351,164 A | 9/1994 | Grigortchak et al. |
| 5,381,301 A | 1/1995 | Hudis |
| 5,381,303 A | 1/1995 | Yoshida et al. |
| 5,398,155 A | 3/1995 | Sato et al. |
| 5,420,747 A | 5/1995 | Ivanov et al. |
| 5,442,197 A | 8/1995 | Andrieu et al. |
| 5,450,279 A | 9/1995 | Yoshida et al. |
| 5,453,909 A | 9/1995 | Kobayashi |
| 5,468,574 A | 11/1995 | Ehrenberg et al. |
| 5,471,365 A | 11/1995 | Nakamura et al. |
| 5,478,363 A | 12/1995 | Klein |
| 5,550,706 A | 8/1996 | Kurzweil et al. |
| 5,581,438 A | 12/1996 | Halliop |
| 5,585,999 A | 12/1996 | De Long et al. |
| 5,593,462 A | 1/1997 | Gueguen et al. |
| 5,620,597 A | 4/1997 | Andelman |
| 5,620,807 A | 4/1997 | Mussell et al. |
| 5,621,607 A | 4/1997 | Farahmandi et al. |
| 5,621,608 A | 4/1997 | Arai et al. |
| 5,649,982 A | 7/1997 | Halliop |
| 5,659,457 A | 8/1997 | Lian et al. |
| 5,665,212 A | 9/1997 | Zhong et al. |
| 5,682,288 A | 10/1997 | Wani |
| 5,697,390 A | 12/1997 | Garrison et al. |
| 5,706,165 A | 1/1998 | Saito et al. |
| 5,742,474 A | 4/1998 | Shimizu et al. |
| 5,748,438 A | 5/1998 | Davis et al. |
| 5,748,439 A | 5/1998 | MacFarlane et al. |
| 5,751,541 A | 5/1998 | Li et al. |
| 5,777,428 A | 7/1998 | Farahmandi et al. |
| 5,785,786 A | 7/1998 | Suzuki et al. |
| 5,786,981 A | 7/1998 | Aoki et al. |
| 5,793,603 A | 8/1998 | Lyman |
| 5,796,574 A | 8/1998 | Saito et al. |
| 5,812,367 A | 9/1998 | Kudoh et al. |
| 5,837,630 A | 11/1998 | Owens et al. |
| 5,847,919 A | 12/1998 | Shimizu et al. |
| 5,847,920 A | 12/1998 | Li et al. |
| 5,850,331 A | 12/1998 | Matsumoto et al. |
| 5,859,761 A | 1/1999 | Aoki et al. |
| 5,862,035 A | 1/1999 | Farahmandi et al. |
| 5,875,092 A | 2/1999 | Jow et al. |
| 5,877,935 A | 3/1999 | Sato et al. |
| 5,907,472 A | 5/1999 | Farahmandi et al. |
| 5,909,356 A | 6/1999 | Hirabayashi et al. |
| 5,914,852 A | 6/1999 | Hatanaka et al. |
| 5,916,485 A | 6/1999 | Besenhard et al. |
| 5,917,693 A | 6/1999 | Kono et al. |
| 5,920,455 A | 7/1999 | Shah et al. |
| 5,923,525 A | 7/1999 | Belyakov et al. |
| 5,926,357 A | 7/1999 | Elias et al. |
| 5,926,361 A | 7/1999 | Alford |
| 5,930,108 A | 7/1999 | Kurzweil et al. |
| 5,949,638 A | 9/1999 | Greenwood et al. |
| 5,955,215 A | 9/1999 | Kurzweil et al. |
| 5,956,225 A | 9/1999 | Okuyama et al. |
| 5,959,832 A | 9/1999 | Kobayashi et al. |
| 6,031,712 A | 2/2000 | Kurihara et al. |
| 6,059,847 A | 5/2000 | Farahmandi et al. |
| 6,094,788 A | 8/2000 | Farahmandi et al. |
| 6,127,060 A | 10/2000 | Read |
| 6,127,474 A | 10/2000 | Andelman |
| 6,195,251 B1 | 2/2001 | Suhara et al. |
| 6,201,685 B1 | 3/2001 | Jerabek et al. |
| 6,212,061 B1 | 4/2001 | Irwin et al. |
| 6,212,062 B1 | 4/2001 | Day et al. |
| 6,233,135 B1 | 5/2001 | Farahmandi et al. |

| | | | | | |
|---|---|---|---|---|---|
| 6,256,190 | B1 | 7/2001 | Wei et al. | | |
| 6,270,707 | B1 | 8/2001 | Hori et al. | | |
| 6,310,756 | B1 | 10/2001 | Miura et al. | | |
| 6,335,857 | B1 | 1/2002 | Takimoto et al. | | |
| 6,359,769 | B1 | 3/2002 | Mushiake et al. | | |
| 6,368,365 | B1 | 4/2002 | Chi et al. | | |
| 6,383,427 | B2 | 5/2002 | Ishikawa et al. | | |
| 6,402,792 | B1 | 6/2002 | Hiratsuka et al. | | |
| 6,424,517 | B1 | 7/2002 | Ikeda et al. | | |
| 6,456,484 | B1 | 9/2002 | Matsuoka et al. | | |
| 6,493,210 | B2 | 12/2002 | Nonaka et al. | | |

FOREIGN PATENT DOCUMENTS

| | | |
|---|---|---|
| EP | 0443825 | 8/1991 |
| EP | 0622815 | 11/1994 |
| EP | 0680061 | 3/1995 |
| JP | 5599714 | 7/1980 |
| JP | 594114 | 1/1984 |
| JP | 59105312 | 6/1984 |
| JP | 63268221 | 4/1988 |
| JP | 63261817 | 10/1988 |
| JP | 64001220 | 1/1989 |
| JP | 64001222 | 1/1989 |
| JP | 1246812 | 2/1989 |
| JP | 6446913 | 2/1989 |
| JP | 1222425 | 5/1989 |
| JP | 1201908 | 8/1989 |
| JP | 1304719 | 8/1989 |
| JP | 1298712 | 12/1989 |
| JP | 265114 | 3/1990 |
| JP | 266917 | 3/1990 |
| JP | 278213 | 3/1990 |
| JP | 21104 | 5/1990 |
| JP | 2177525 | 7/1990 |
| JP | 2248025 | 10/1990 |
| JP | 256805 | 12/1990 |
| JP | 2297915 | 12/1990 |
| JP | 34510 | 1/1991 |
| JP | 3038815 | 2/1991 |
| JP | 3132009 | 6/1991 |
| JP | 3141629 | 6/1991 |
| JP | 3201516 | 6/1991 |
| JP | 3289116 | 12/1991 |
| JP | 465814 | 3/1992 |
| JP | 474405 | 3/1992 |
| JP | 488619 | 3/1992 |
| JP | 499305 | 3/1992 |
| JP | 4206914 | 7/1992 |
| JP | 4206916 | 7/1992 |
| JP | 4336409 | 11/1992 |
| JP | 513284 | 1/1993 |
| JP | 555085 | 3/1993 |
| JP | 5217803 | 8/1993 |
| JP | 5258996 | 10/1993 |
| JP | 5299295 | 11/1993 |
| JP | 6275469 | 6/1994 |
| JP | 10244380 | 9/1998 |
| WO | 9309552 | 5/1993 |

OTHER PUBLICATIONS

Farahmandi, et al.; "Bipolar Electrochemical Capacitors Based on Organic Electrolytes for Electric Vehicle Applications", *The Fourth International Seminar on Double Layer Capacitors and Similar Energy Storage Devices, Boca Raton, Florida*, (Dec. 12–14, 1994).

Farahamndi, et al.; "A Comparison of Electrochemical Capacitors Using Organic and Aqueous Electrolytic Solutions for Electric Vehicle Applications", *Third International Seminar on Double Layer Capacitors and Similar Energy Storage Devices, Deerfield Beach, Florida*, (Dec. 6–8, 1993).

Fujii; "KYNOL Novoloid Fibers", *Informational Brochure*, (1990).

*Technical Notes*, "The Charcoal Cloth", (1987).

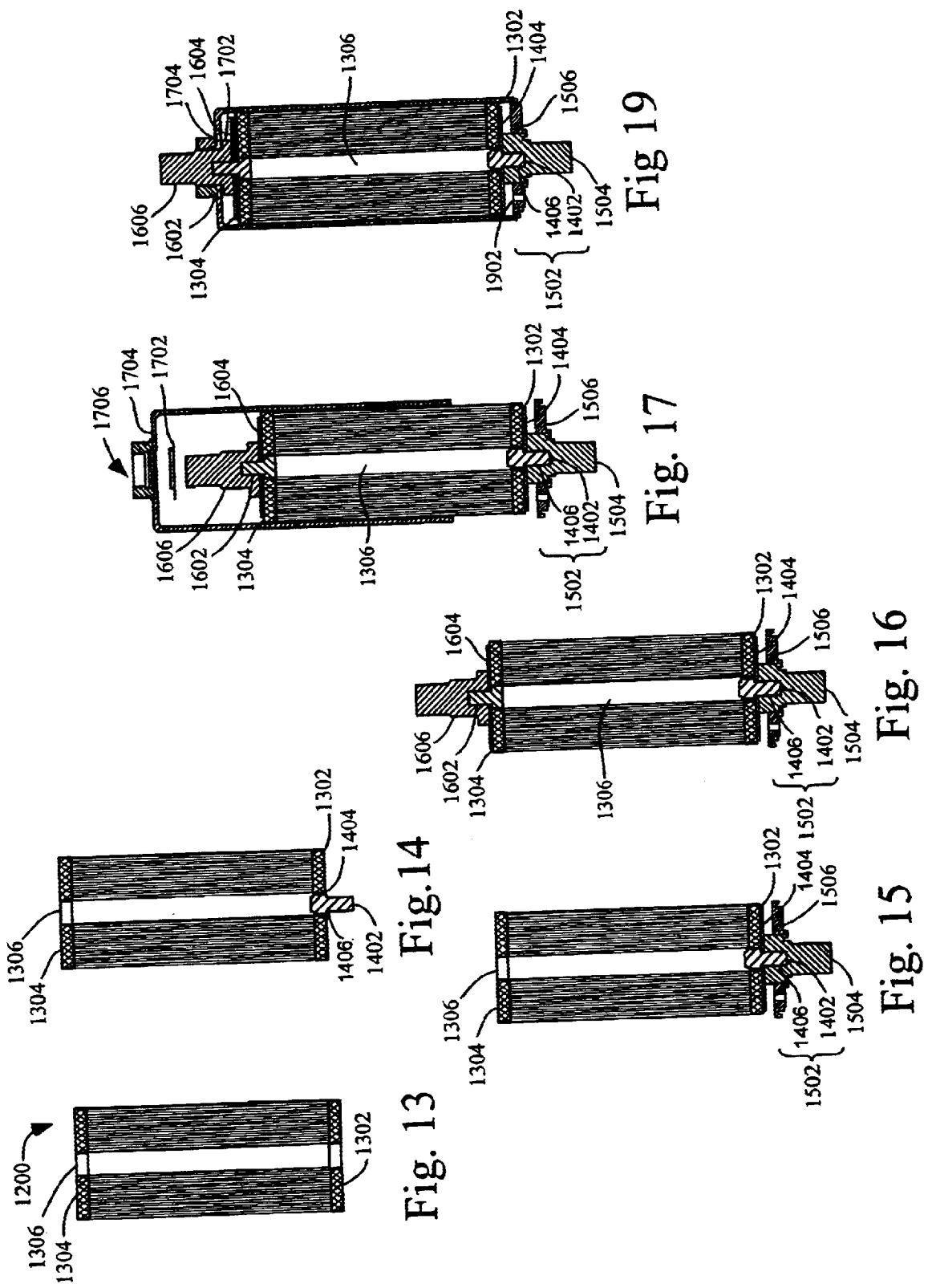

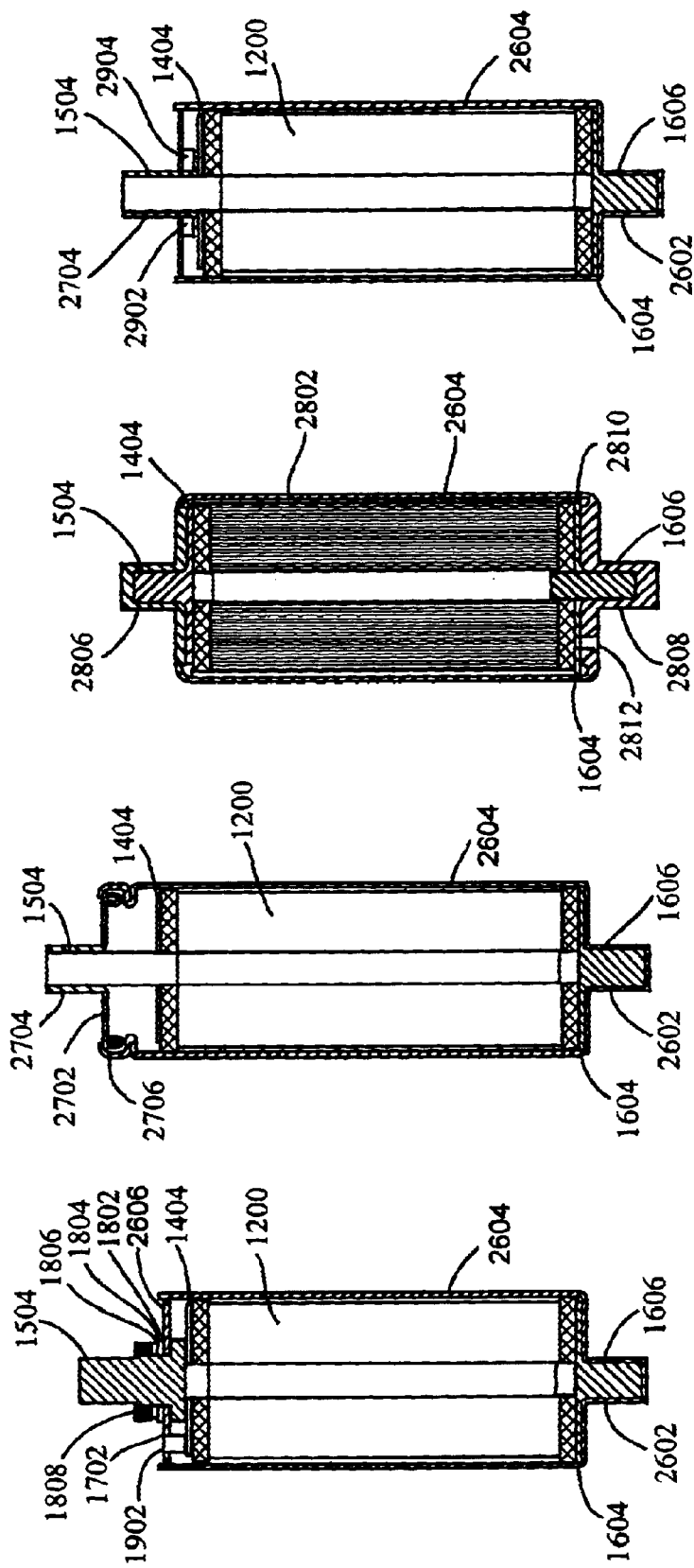

ELECTROCHEMICAL DOUBLE LAYER CAPACITOR HAVING CARBON POWDER ELECTRODES

BACKGROUND OF THE INVENTION

The present invention relates generally to electrochemical double layer capacitors, and more particularly to a high performance electrochemical double layer capacitor made with low-resistance carbon powder electrodes.

Double layer capacitors, also referred to as electrochemical double layer capacitors (EDLC), are energy storage devices that are able to store more energy per unit weight and unit volume than traditional capacitors. In addition, because of their relatively low internal resistance, double layer capacitors can typically be charged and can, in turn, deliver stored energy at a higher power rating than rechargeable batteries.

Double layer capacitors may consist of two carbon electrodes that are isolated from electrical contact by a porous separator. Both the porous separator and the electrodes are immersed in an electrolyte solution, allowing ionic current (ionic flow) to flow between the electrodes through the separator at the same time that the separator prevents an electrical or electronic (as opposed to an ionic) current from shorting the two carbon electrodes.

Coupled to the back of each of the two carbon electrodes is typically a current collecting plate. One purpose of the current collecting plates is to reduce ohmic losses, i.e., internal resistance, in the double layer capacitor.

Double layer capacitors store electrostatic energy in a polarized liquid layer that forms when an electrical potential exists between the two carbon electrodes immersed in an electrolyte (or electrolyte solution). When the electrical potential is applied across the electrodes, a double layer of positive and negative charges is formed at the electrode-electrolyte interface (hence, the name "double layer" capacitor) by the polarization of electrolyte ions due to charge separation under the applied electrical potential, and also due to dipole orientation and alignment of electrolyte molecules over an entire surface of the electrodes.

Fabrication of double layer capacitors with carbon electrodes is described in U.S. Pat. Nos. 2,800,616 (Becker), and 3,648,126 (Boos et al.).

A major problem in many carbon-electrode capacitors, including electrochemical double layer capacitors with carbon electrodes, is that the performance of the carbon-electrode capacitor is often limited because of high internal resistance related to the carbon electrodes. This high internal resistance may be due to several factors, including high contact resistance of carbon-carbon contacts within the carbon electrodes, and further including high contact resistance of the electrode-current collector contacts. This high internal resistance translates to large ohmic losses in the carbon-electrode capacitor during charging and discharging of the carbon-electrode capacitor. These high ohmic losses further adversely affect, i.e., increase, a characteristic RC (resistance times capacitance) time constant of the capacitor and thus interfere with the carbon-electrode capacitor's ability to be efficiently charged and/or discharged in a short period of time.

There is thus a need in the art for systems and methods that lower the internal resistance within a carbon-electrode capacitor, and hence lower the characteristic RC time constant, of the carbon-electrode capacitors, as well as other improvements.

U.S. Pat. No. 5,907,472 to Farahmandi et al., the complete disclosure of which is incorporated herein by reference, discloses a multi-electrode double layer capacitor having aluminum-impregnated carbon cloth electrodes. The use of the aluminum-impregnated carbon cloth electrodes described therein results in an electrochemical double layer capacitor having a very low internal resistance.

U.S. patent application Ser. No. 09/569,679 of Nanjundiah et al., the complete disclosure of which is incorporated herein by reference, discloses an electrochemical double layer capacitor having low-resistance carbon powder electrodes.

There is also a continuing need for improved electrochemical double layer capacitors. Such improved electrochemical double layer capacitors need to deliver large amounts of useful energy at a very high power output, and very high energy density ratings within a relatively short period of time. Such improved electrochemical double layer capacitors should also have a relatively low internal resistance, and hence a relatively low characteristic RC time constant, and yet be capable of yielding a relatively high operating voltage.

Furthermore, it is apparent that improvements are needed in the techniques and methods of fabricating electrochemical double layer capacitor electrodes so as to lower the internal resistance of the electrochemical double layer capacitor, and hence lower the characteristic RC time constant and maximize the operating voltage.

Since capacitor energy density increases with the square of the operating voltage, higher operating voltages thus translate directly into significantly higher energy densities and, as a result, higher power output ratings. Thus, improved techniques and methods are needed to lower the internal resistance of the electrodes used within an electrochemical double layer capacitor and increase the operating voltage.

SUMMARY OF THE INVENTION

The present invention advantageously addresses the needs above as well as other needs by providing a method of making an electrode structure for use in an electrochemical double layer capacitor.

In one embodiment, the invention may be characterized as a method of making an electrode structure for use in a double layer capacitor, comprising the steps of: forming a plurality of electrodes, each of the plurality of electrodes comprising: a current collector plate; a primary coating formed on a portion of each side of the current collector plate, the primary coating including conducting carbon powder and a binder; and a secondary coating formed on each primary coating, the secondary coating including activated carbon powder, a solvent and a binder; positioning a respective separator between each of the plurality of electrodes while stacking the plurality of electrodes on top of each other such that the respective separator is juxtaposed against respective secondary coatings of adjacent ones of the plurality of electrodes, wherein the respective separator electrically insulates the adjacent ones of the plurality of electrodes from each other, whereby forming a stack of the plurality of electrodes with a respective separator positioned in between respective ones of the plurality of electrodes; and rolling the electrode stack starting at one end of the electrode stack into a cylindrical structure.

In another embodiment, the invention may be characterized as a method of making an electrode structure for use in a double layer capacitor, comprising the steps of: forming a plurality of electrodes, each of the plurality of electrodes comprising: a current collector plate having a length and a width and a thickness; a primary coating formed on a portion of each side of the current collector plate, the portion covering an area extending the full length of the current collector plate and extending a portion of the width of the current collector plate, the primary coating including conducting carbon powder and a binder; and a secondary coating formed on each primary coating, the secondary coating including activated carbon powder, a solvent and a binder; positioning a respective separator between each of the plurality of electrodes while stacking the plurality of electrodes on top of each other such that the respective separator is juxtaposed against respective secondary coatings of adjacent ones of the plurality of electrodes, wherein the respective separator electrically insulates the adjacent ones of the plurality of electrodes from each other, whereby forming a stack of the plurality of electrodes with a respective separator positioned in between respective ones of the plurality of electrodes, the electrode stack having a stack length and a stack width; and rolling the electrode stack starting at one end of the electrode stack along the stack length into a cylindrical structure.

In yet another embodiment, the invention may be characterized as an electrode structure for use in a double layer capacitor comprising: a rolled electrode stack comprising: a plurality of electrodes, each of the plurality of electrodes comprising: a current collector foil; a primary coating formed on a portion of each side of the current collector foil, the primary coating including conducting carbon powder and a binder; and a secondary coating formed on each primary coating, the secondary coating including activated carbon powder, a solvent and a binder. The rolled electrode stack also comprises a respective separator positioned between each of the plurality of electrodes in a stack such that the respective separator is juxtaposed against respective secondary coatings of adjacent ones of the plurality of electrodes. The respective separator electrically insulates the adjacent ones of the plurality of electrodes from each other. The electrode stack is rolled starting at one end of the electrode stack into a cylindrical structure to form the rolled electrode stack.

In a further embodiment, the invention may be characterized as a double layer capacitor comprising a capacitor can having a first terminal and a second terminal and a rolled electrode structure contained within the capacitor can. The rolled electrode structure comprising a plurality of electrodes, each of the plurality of electrodes comprising a current collector foil and a primary coating formed on a portion of each side of the current collector foil. The primary coating includes conducting carbon powder and a binder. Each electrode also includes a secondary coating formed on each primary coating. The secondary coating includes activated carbon powder, a solvent and a binder. Also, a respective separator is positioned between each of the plurality of electrodes in a stack such that the respective separator is juxtaposed against respective secondary coatings of adjacent ones of the plurality of electrodes. The respective separator electrically insulates the adjacent ones of the plurality of electrodes from each other. The electrode stack is rolled starting at one end of the electrode stack into a cylindrical structure to form the rolled electrode structure. And, the capacitor includes an electrolytic solution contained within the capacitor can.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof presented in conjunction with the following drawings wherein;

FIG. 13 is a side cross-sectional view of the "jellyroll" electrode assembly of FIG. 12, having the winding layers of FIG. 11;

FIG. 14 is a side cross-sectional view of the "jellyroll" electrode assembly of FIG. 12, having the winding layers of FIG. 11, and further having a first plug;

FIG. 15 is a side cross-sectional view of the "jellyroll" electrode assembly of FIG. 12, having the winding layers of FIG. 11, and the first plug of FIG. 14, and further having a remainder of a first terminal assembly;

FIG. 16 is a side cross-sectional view of the "jellyroll" electrode assembly of FIG. 12, having the winding layers of FIG. 11, the first plug of FIG. 14 and the remainder of a first terminal assembly of FIG. 15, and further having a second plug, a second collector disk and a second terminal post;

FIG. 17 is a side, exploded cross-sectional view of the "jellyroll" electrode assembly of FIG. 12, having the winding layers of FIG. 11, the first plug of FIG. 14, the remainder of the first terminal assembly of FIG. 15 and the second plug, the second collector disk and the second terminal post of FIG. 16, and further having a first insulating washer, and a can;

FIG. 19 is a side cross-sectional view of the "jellyroll" electrode assembly of FIG. 12, having the winding layers of FIG. 11, the first plug of FIG. 14, the remainder of the first terminal assembly of FIG. 15, the second plug, the second collector disk and the second terminal post of FIG. 16, the first insulating washer, and the can FIG. 17, the second insulating washer, the flat washer, the Belleville washer and the locknut of FIG. 18;

FIG. 26 is a side cross-sectional view of another variation of the "jellyroll" embodiment of FIGS. 12 through 20, employing a pocket in the can in a modified second electrode assembly;

FIG. 27 is a side cross-sectional view of another variation of the "jellyroll" embodiment of FIGS. 12 through 20, employing a crimp seal to secure a lid to the can, and employing a pocket in the lid in a modified first electrode assembly;

FIG. 28 is a side cross-sectional view of another variation of the "jellyroll" embodiment of FIGS. 12 through 20, employing a low profile "can-within-a-can" assembly and modified first and second electrode assemblies; and FIG. 29 is a side cross-sectional view of another variation of the "jellyroll" embodiment of FIGS. 12 through 20, employing a ceramic seal between the lid and the first terminal assembly.

Corresponding reference characters indicate corresponding components throughout several views of the drawing.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
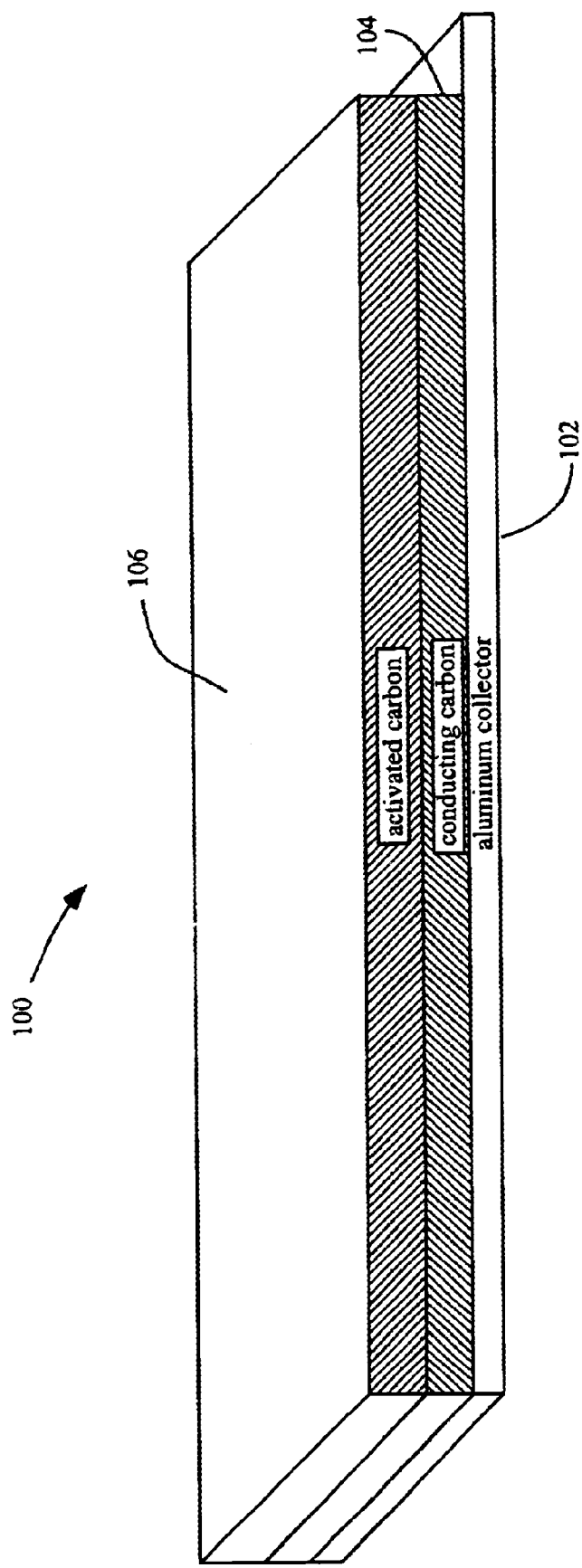
FIG. 1 is cross-sectional view of a carbon electrode including a foil collector, a first layer of conducting carbon, and a second layer of activated carbon, in accordance with one embodiment of the present invention.

Referring to FIG. 1, shown is a cross-sectional view of a carbon electrode 100 including a foil collector 102, a first layer of conducting carbon 104, and a second layer of activated carbon 106, in accordance with one embodiment of the present invention.

All else being equal, the greater carbon quantity per unit volume that can be achieved within an electrochemical double layer capacitor, the greater the capacitance of the electrochemical double layer capacitor.

This factor alone, however, would suggest that the ideal design for an electrochemical double layer capacitor is a design in which two "chunks" of activated carbon juxtaposed against opposite sides of a porous separator, and bracketed by terminal assemblies, one for each "chunk", are employed to maximize the percentage of the volume of the electrochemical double layer capacitor that is occupied by carbon, and minimize the percentage of the volume of the electrochemical double layer capacitor that is occupied by the porous separator and the terminal assemblies. This "brick sandwich" would then be immersed in an electrolyte, and housed within an appropriate container.

Problematically however, it has also been found that the greater the length an average electron (or hole) must travel through the carbon in charging or discharging the electrochemical double layer capacitor to a given charge, the greater the internal resistance of the electrochemical double layer capacitor, and thus the greater the RC time constant of the electrochemical double layer capacitor.

This fact alone would suggest that the ideal design for an electrochemical double layer capacitor is a design in which a large number of "specs" of activated carbon in an infinitely thin sheet juxtaposed against opposite sides of one or more porous separators are surrounded by large amounts of a highly conductive collector, so as to minimize the length an average electron (or hole) must travel through the carbon in charging or discharging the electrochemical double layer capacitor. This design would then be immersed in an electrolyte, and housed within an appropriate container.

Neither of these extremes, however, is, in fact, ideal. Both the design of electrodes, and the design of the housing in which the electrodes, porous separator, and electrolyte are contained represent a balance between these two extremes, in order to both maximize capacitance, and at the same time minimize internal resistance of the electrochemical double layer capacitor.

In order to achieve this objective, "effectivity" and "utilization" of the carbon used should be maximized by maximizing the surface area of the carbon used, minimizing the resistivity of the carbon used, and, at the same time, maintaining pore size, and particle size (and thus packing density) of the carbon that optimize both the "effectivity" and "utilization" of the carbon used.

The design of the present embodiment represents a significant improvement over prior approaches because, in part, such design has as its object the above-referenced balance between maximizing carbon and minimizing internal resistance, and as its further object maximizing "effectivity" and "utilization" of the carbon.

The design begins with the electrodes, which, simplified, are as depicted in FIG. 1. Each electrode consists of a thin metal collector 102, onto which are formed two layers of carbon 104, 106, one on top of the other. The metal collector 102 serves both as a very low resistance current path into and out of the carbon electrode 100, but also as a mechanical platform for the two layers 104, 106.

The first layer 104, i.e., the layer in direct mechanical and electrical contact with the thin metal collector 102, is of a "conducting carbon," such as graphitic carbon (i.e., carbon having a laminar structure). This first layer 104 is approximately three times as conducting as the second layer 106, adheres well to both the thin metal collector 102 and the second layer 106, and provides low interfacial resistances between the thin metal collector 102 and the second layer 106. The first layer 104 of conducting carbon (including binder used in the first layer 104) should also be stable in the electrolyte solution selected for use in the electrochemical double layer capacitor.

The second layer 106 is of an "activated carbon," and has surface area, pore size and particle size (packing density) characteristics, and Farads/cc and Farads/g that tend to maximize both the "efficiency" and the "utilization" of the activated carbon. The second layer of activated carbon 106 should maximize capacitance, be stable (including binder used in the second layer) in the electrolyte solution selected for use in the electrochemical double layer capacitor, and should have low resistance of the bulk.

The thin metal collector 102, or current collector 102 may be, for example, an aluminum foil current collector. Foil suitable for the aluminum foil collector (foil collector 102) is available from All-Foils Incorporated of Ohio as Al 1145 fully annealed to full hardened alloy, with a thickness of 12.5 to 50 micrometers, e.g., 1 mil, and a resistivity from between 2.83 to 2.87 micro ohms per centimeter.

The first layer 104 is formed onto the surface of the current collector 102, and may comprise carbon powder such as, for example, Black Pearl 2000, available from Cabot, of Billerica, Mass. Desirable properties of the first layer 104 are low resistivity, e.g., less than four ohms per centimeter; that the first layer 104 adheres well to both the current collector 102 (foil collector 102) and the activated carbon of the second layer 106; low interfacial and sheet resistances between the conducting carbon and the current collector 102 (foil collector 102), and between the conducting carbon 104 and the activated carbon 106, e.g., less than five milliohms $cm^2$.

The second layer 106 is formed onto the first layer 104, and may comprise activated carbon powder. The activated carbon powder used in the carbon electrodes is used to provide high capacitance, due to high "effectivity" and "utilization." A high capacitance is possible due, in part, to the large BET surface area of the activated carbon powders, which is on the order of 500 to 2500 $m^2/g$, e.g., 1900 $m^2/g$ for activated carbon, such as BP20, available from Kuraray Chemical of Japan. Surface area of the activated carbon powders is related to particle size distribution, which falls in the range of 3 to 30 μm with a $d_{50}$=8 μm. A wide range of particle sizes allows for an efficient packing density; small particles pack within the voids created by larger particles. Such activated carbon may be produced using starting materials such as kynel, rayon, coconut shell, or the like. Iodine absorption for such activated carbon may be, for example, 500 to 2500 mg/g, e.g., 2000 mg/g. Moisture content by a percentage of weight may be, for example, 0.2 to 0.7 percent; ash content by weight may be, of example, 0.05 to 0.12 percent; particle diameter may be, for example, 3 to 30 nanometers; pore size distribution may be, for example, 60 to 500 nanometers, e.g., 60 to 300 nanometers; capacitance may be, for example, 22 to 35 Farads per gram, e.g., 25 Farads per gram, i.e., for example, 15 to 20 Farads per cc., e.g., 16 Farads per cc.

An important parameter in design optimization is Farads/cc—affecting "effectivity" and "utilization". On a base materials level, this is affected by the pore distribution, which typically ranges from 8 to 50 Å. On an electrode level, the packing density of the powder comprising the electrodes determines Farads/cc. Carbon electrodes for the present electrochemical double layer capacitor application are fabricated with a desired electrode porosity (i.e., void to volume ratio) of 25% to 35%, which should be achieved through the selection of packing density and drying conditions. The electrode porosity is optimized to maximize particle-to-particle contact, to lower the resistance, and facilitate electrolyte permeation allowing for wetting of the carbon surfaces.

In order to further reduce the resistivity of the resultant electrode 100, a small percentage (e.g., 1 to 5%) of conducting carbon, which is more conducting than the activated carbon powder, such as Black Pearl 2000, available from Cabot of Billerica, Mass., may be added to the slurry used to form the second layer 106.

A method of making the electrode 100 comprises applying powdered carbon in, for example, a slurry, a paste or a gel form (referred to generally herein as a slurry form) onto current collector 102 (e.g., current collector plate 102 or foil 102, such as aluminum foils) or onto other layers already on the current collector. Such a slurry form of powdered carbon may be made in a solution containing a polymer binder.

The binder may include, for example, polyvinylpyrrolidone; polyamide or the like. Preferred binder may be Kynar 761 or Kynar 2801 available from Atofina Chemicals of Pennsylvania. The binder should be insoluble in the selected electrolyte, for example, insoluble in acetonitrile; and soluble in formulating solvents such as water, acetone, methyl ethyl ketone, N-methyl pyrolidone and the like. The binder should have a volume resistivity higher than $10^9$ ohms per centimeter, e.g., $2 \times 10^{14}$ ohms per centimeter; thermal decomposition at greater than 150 degrees centigrade, e.g., no less than 375 degrees centigrade, and wettability with aluminum should be good.

Thus, the electrode 100 is made by applying a first layer of conducting carbon 104 (with a binder in a slurry) to the current collector 102; and a second layer of activated carbon 106 (with a small amount of conducting carbon, and with a binder in a slurry) to the first layer 104.

Figure 2:
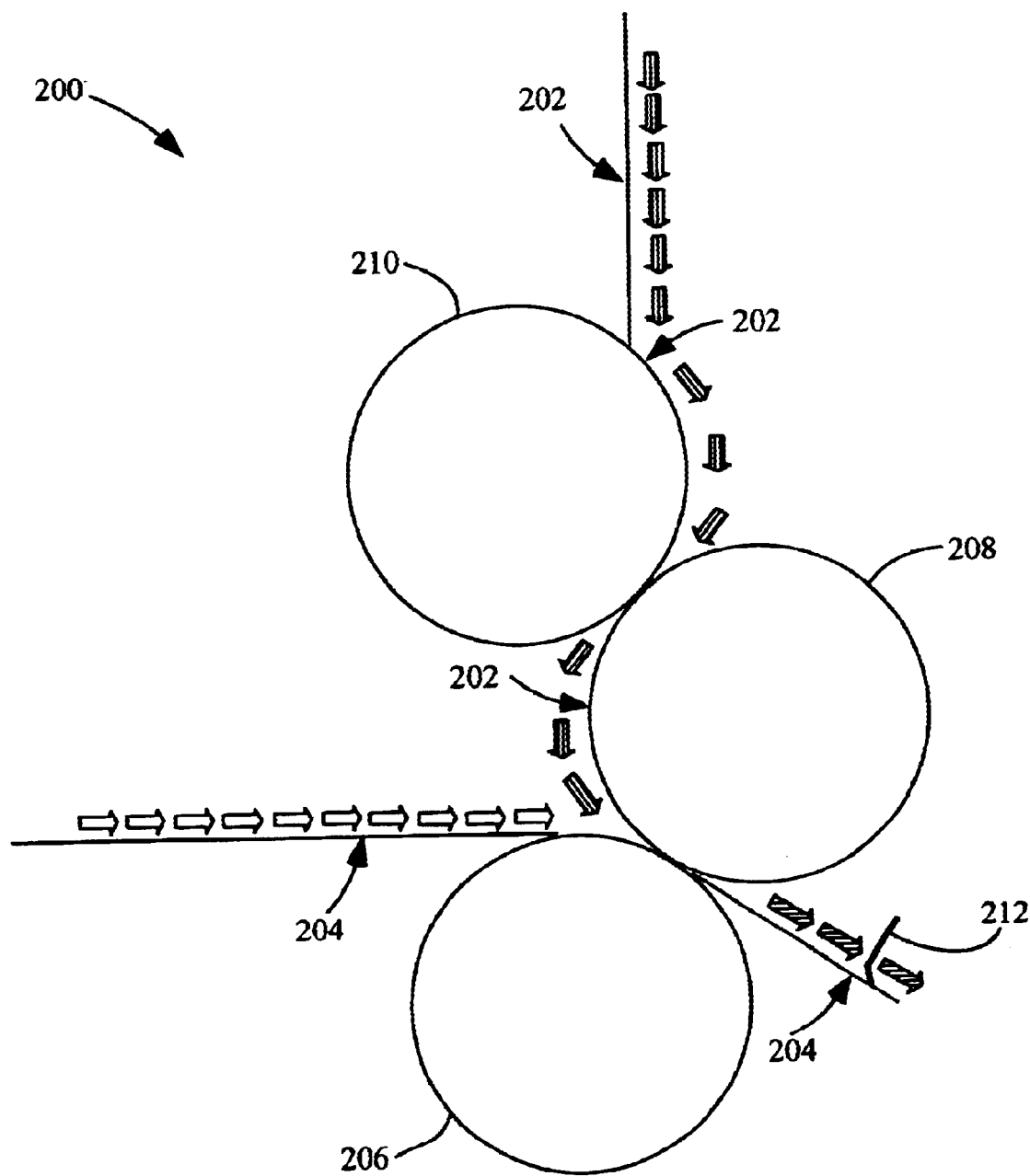
FIG. 2 is a schematic diagram illustrating slurry transfer apparatus and process for applying carbon powder slurry, such as conducting carbon powder slurry or activated carbon powder slurry, to a surface of a foil, so as to form the first layer of conducting carbon or the second layer of activated carbon on the surface of the foil, so as to form the foil electrode of FIG. 1.

Referring next to FIG. 2, a schematic diagram is shown illustrating slurry transfer apparatus and process 200 for applying carbon powder slurry 202, such as conducting carbon powder slurry or activated carbon powder slurry, to a surface of a current collector 204 (or foil 204), so as to form the first layer of conducting carbon or the second layer of activated carbon on the surface of the foil.

Prior to the coating process, the surface of the foil 204 can be corona treated, or mechanically or chemically modified, changing the surface energy of the aluminum surface to promote wettability and adhesion.

In accordance with the present embodiment, the coating process proceeds in two steps. The first step involves applying a first layer (or primary coating) to the bare aluminum surface of the foil 204 as a slurry 202 containing a suitable binder (e.g., a water-based binder, such as polyvinylpyrrolidone (PVP), ethylene acrylic acid (EAA); or a solvent-based binder, such as PVDF—"Kynar" 761 or "Kynar" 2801—available from Atofina Chemicals of Philadelphia, Pa., and a suitable solvent, e.g. NMP, MEK, acetone or mixtures thereof). In addition, adhesion promoters may be employed within the primary coating to improve the integrity of the electrode without increasing the interfacial resistance. The proportion by weight of highly conducting carbon (verses other constituents, such as the binder and the solvent) included in the primary coating preferably falls in the range of 25%–95%. The primary coating preferably does not contain activated carbon.

The primary coating reduces the interfacial resistance and serves as a seed coat for a secondary coating.

The primary coating is applied using a slurry transfer apparatus and method 200, such as a reverse comma coat system and method, as illustrated. Other methods such as slot coating; gravure, extrusion, flexographic or roll coating methods may be used.

The reverse comma coat system and method 200 is illustrated. Shown is a transport roller 206, a transfer roller 208, and a carbon slurry roller 210. Also shown is a set of wipers 212.

In practice the foil 204 passed between, the transport roller, and the transfer roller. Spacing between the transport roller 206, against which the foil 204 is held tightly, and the transfer roller 208, determines the thickness of the primary coating. The carbon slurry 202, such as that described above for use in applying the primary coating, is introduced onto the carbon slurry roller 210, and carried to the transfer roller 208. The carbon slurry 202 is then passed between the carbon slurry roller 210 and the transfer roller 208. As a result, a portion of the carbon slurry 202 is transferred to the transfer roller 208, and is then, in turn, transferred to one side of the foil 204.

Reverse comma coat methods and systems are well known, and thus further explanation thereof is not made herein.

After the carbon slurry 202 is transferred to the one side of the foil 204, the set of wipers 212 removes portions of the primary coating at edges of the foil 204, and at a center of the foil 204, for use in creating contact edges and for assuring that a clean edge can be made after cutting and handling of the foil 204, as explained more fully below.

The second layer (or secondary coating) is applied over the primary coating, either during a second pass through the reverse comma coat system 200, or inline using a second reverse comma coat system. In either case, the secondary layer is applied after sufficient curing of the primary layer has taken place (by evaporation of the solvent), so as to maintain distinct primary and secondary layers.

The secondary coating comprises an activated carbon that is derived from either kynel, coconut or rayon base materials. As mentioned, this activated carbon has a high surface area, typically of the order of 1000 to 2500 $m^2/g$, in order to increase "effectivity". The secondary coating is applied using slurry comprising the high surface area activated carbon, a suitable binder (e.g., PVDF—"Kynar" 2801 available from Atofina Chemicals of Philadelphia, Pa.) and a suitable solvent (e.g. NMP, MEK, acetone or a mixture thereof). The proportion by weight of activated carbon included in the secondary coating preferably, as opposed to other constituents (including binder and solvent), falls in the range of 5% to 40%, e.g., approximately 30%. The secondary coating may also include a small amount of conducting carbon, such as the conducting carbon used in the first layer. The proportion by weight of highly conducting carbon included in the secondary coating preferably falls in the range of 0.01% to 5%, e.g., approximately 0.3%. This slurry is coated onto the primary carbon coat using the reverse comma coat process (or other process), as described above.

Although the process described above is an effective way of reducing the interfacial and sheet resistance, the process steps involved become somewhat more complicated when coating of the foil 204 on both sides, as opposed to one side, is desired. To complete the coating of the foil 204, in order to achieve a double-sided foil, the foil 204 goes through the reverse comma coat system and method 200 four times, once for each of the first and second layers, on each of the first and second sides.

The reverse comma coat method and system 200 used to apply the secondary coating are similar to those used to apply the primary coating, including the use of the set of wipers 212 to remove portions of the secondary coating at the edges and at the center of the foil 204. Thus, further separate explanation of the reverse comma coat system and method 200 used to apply the secondary coating is not made herein.

Figure 3:
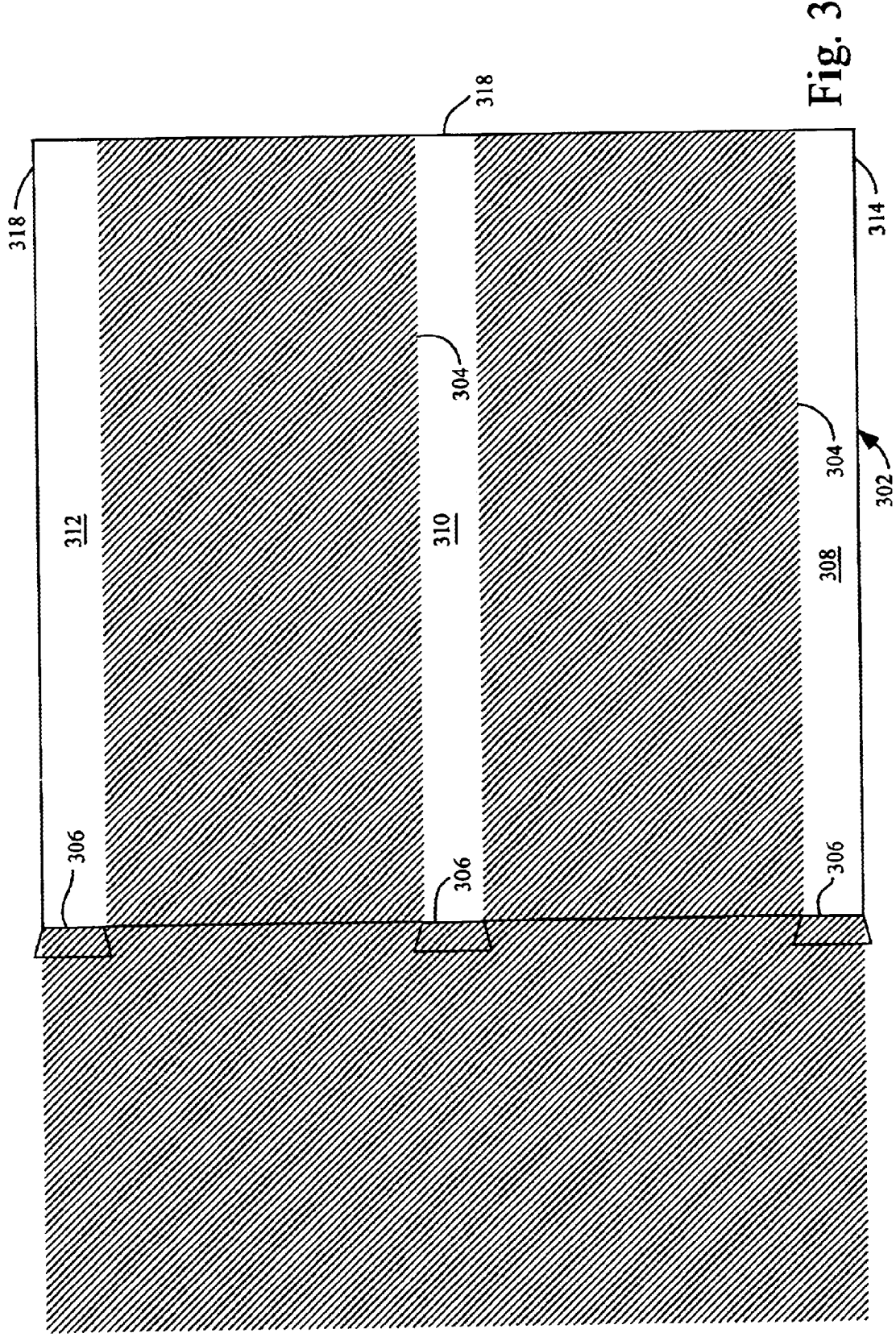
FIG. 3 is a top view of the foil, the carbon powder slurry, and a row a wipers that remove the carbon powder slurry from three strips (or lanes) of the foil as the foil passes through the slurry transfer apparatus of FIG. 2., so as to form contact edges of the foil electrode of FIG. 1.

Referring to FIG. 3, a top view is shown of the foil 302, the carbon powder slurry 304, and the set of wipers 306 in a row that remove the carbon powder slurry 304 from the foil 302 in three strips 308, 310, 312 (or lanes 308, 310, 312) as the foil 302 passes through the slurry transfer apparatus 200 of FIG. 2.

The three lanes 308, 310, 312 are located at the edges 314, 316 of the foil 302, and at the center 318 of the foil 302, and are substantially free of the carbon powder slurry 304. The outermost two of these three lanes 308, 312 are used to assure clean edges can be achieved at the edges 314, 316 of the foil 302 (without any curling, or bending that may result from handling of the foil 302 before, during or after the application of the first layer and the second layer). Furthermore, these three lanes 308, 310, 312 are used to create a contact edge (not shown) at one edge of the carbon electrode (explained more fully hereinbelow), whereby a low resistance electrical connection between a terminal and the carbon electrode can be made.

Figure 4:
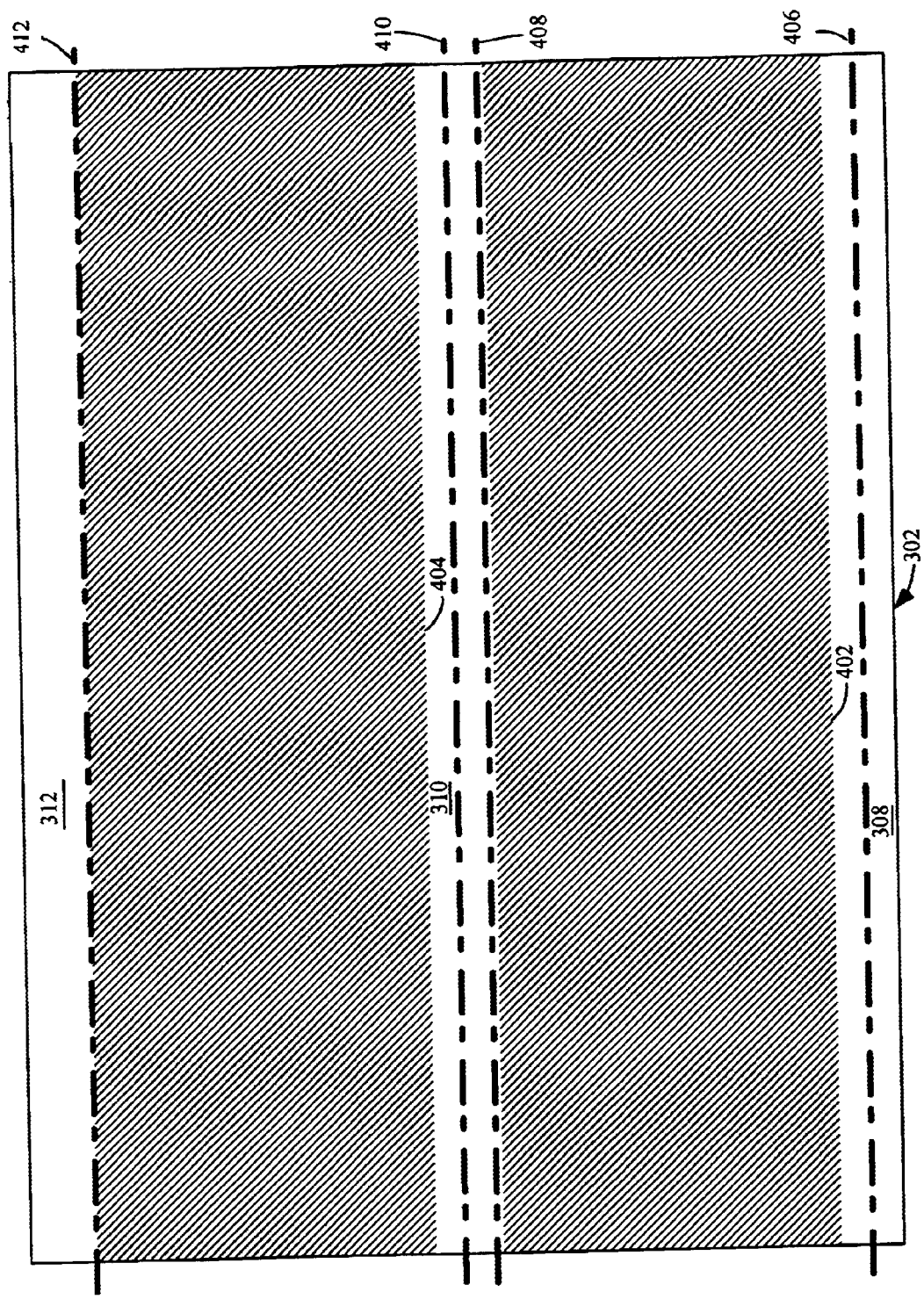
FIG. 4 is a top view of a foil having three lanes of the foil (with the carbon powder slurry having been removed by the wipers of FIG. 3) separated by regions coated with a first layer of conducting carbon and a second layer of activated carbon.

Referring next to FIG. 4, a top view is shown of the foil 302 having the three lanes 308, 310, 312 of the foil 302 (with the carbon powder slurry having been removed by the wipers of FIG. 3) separated by regions 402, 404 coated with a first layer of conducting carbon and a second layer of activated carbon.

Also shown are four cut lines 406, 408, 410, 412 along which cuts in the foil 302 are made after the first layer and the second layer have cured.

Cutting of the foil 302 along the four cut lines 406, 408, 410, 412 is preferably achieved using a precision blade cutting apparatus (not shown), which may be in an apparatus separate from the slurry transfer apparatus 200 (FIG. 2), or placed in-line with the slurry transfer apparatus 200 (FIG. 2). Such cutting apparatus are known in the art, and thus further explanation thereof is not made herein. Cutting of the foil 302 along the cut lines 406, 408, 410, 412 assures a clean edge for the electrodes, results in the contact edge along one edge of each electrode, and cuts the foil 302 in half down its length, so as to form two electrodes. The contact edge provides a low resistance current path between each terminal of the electrochemical double layer capacitor, and a respective electrode.

A first cut 410 is made down the center of the foil, and a second cut 406 is made down a center of one of the lanes 308 at the edge of the foil 302. A third cut 412 is made along one edge of the second region 404 coated with the first and second layers, so as to remove the other lane 312 at the edge of the foil 302, and a fourth cut 408 is made along another edge of the first region 402 coated with the first and second layers, so as to remove a remainder of the center lane 310 opposite the one edge of the foil 302.

As a result of the cutting of the foil 302, two identical separate electrodes are formed, each having a contact edge, and a region coated with the first and second layers, the first being formed from half of the one lane 308 and the first region 402 coated by the first and second layers, and the second being formed from half of the center lane 310 and the second region 404 coated by the first and second layers.

Numerous variations on the above-described embodiment for cutting the foil 302 so as to form the first and second electrodes are contemplated by the inventors and are within the scope of the present embodiment.

Figure 5:
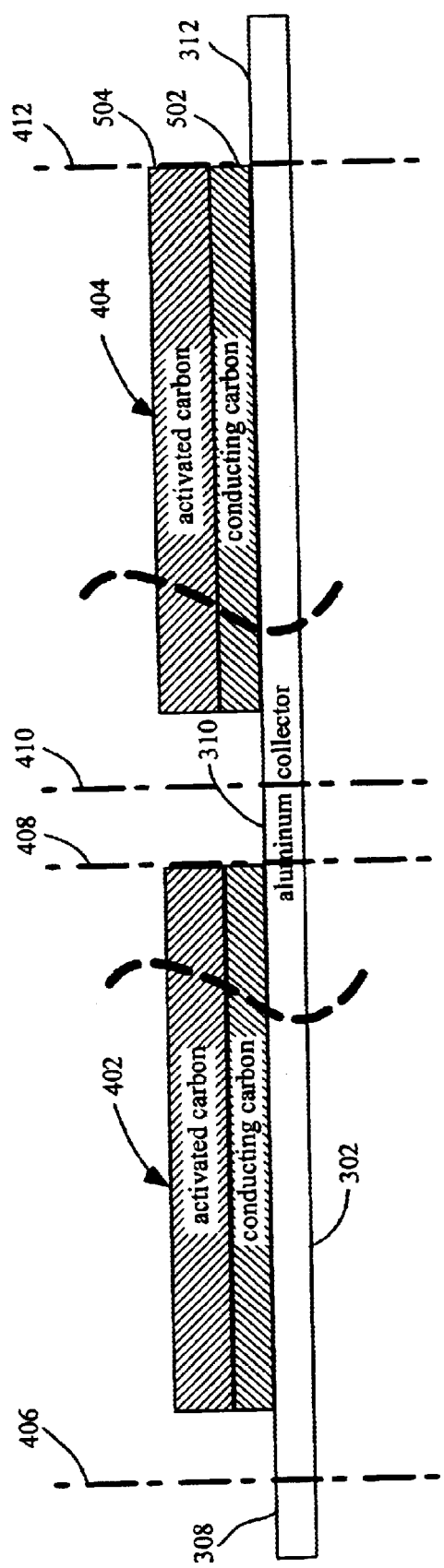
FIG. 5 is a side cross-sectional view of the foil of FIG. 4 having three lanes of the foil separated by regions coated with the first layer of conducting carbon and a second layer of activated carbon.

Referring to FIG. 5, a side cross-sectional view is shown of the foil of FIG. 4 having the three lanes of the foil 302 separated by the regions 402, 404 coated with the first layer of conducting carbon 502 and a second layer of activated carbon 504.

As can be seen, the first layer 502 and the second layer 504 are coated onto the foil 302, with the three lanes having been cleared of the first layer and the second layer by the set of wipers.

Also shown are the four cut lines 406, 408, 410, 412 along which the cuts in the foil 302 are made after the first layer 502 and the second layer 504 have cured. The four cuts are made along the four cut lines 406, 408, 410, 412, as described above.

Figure 6:
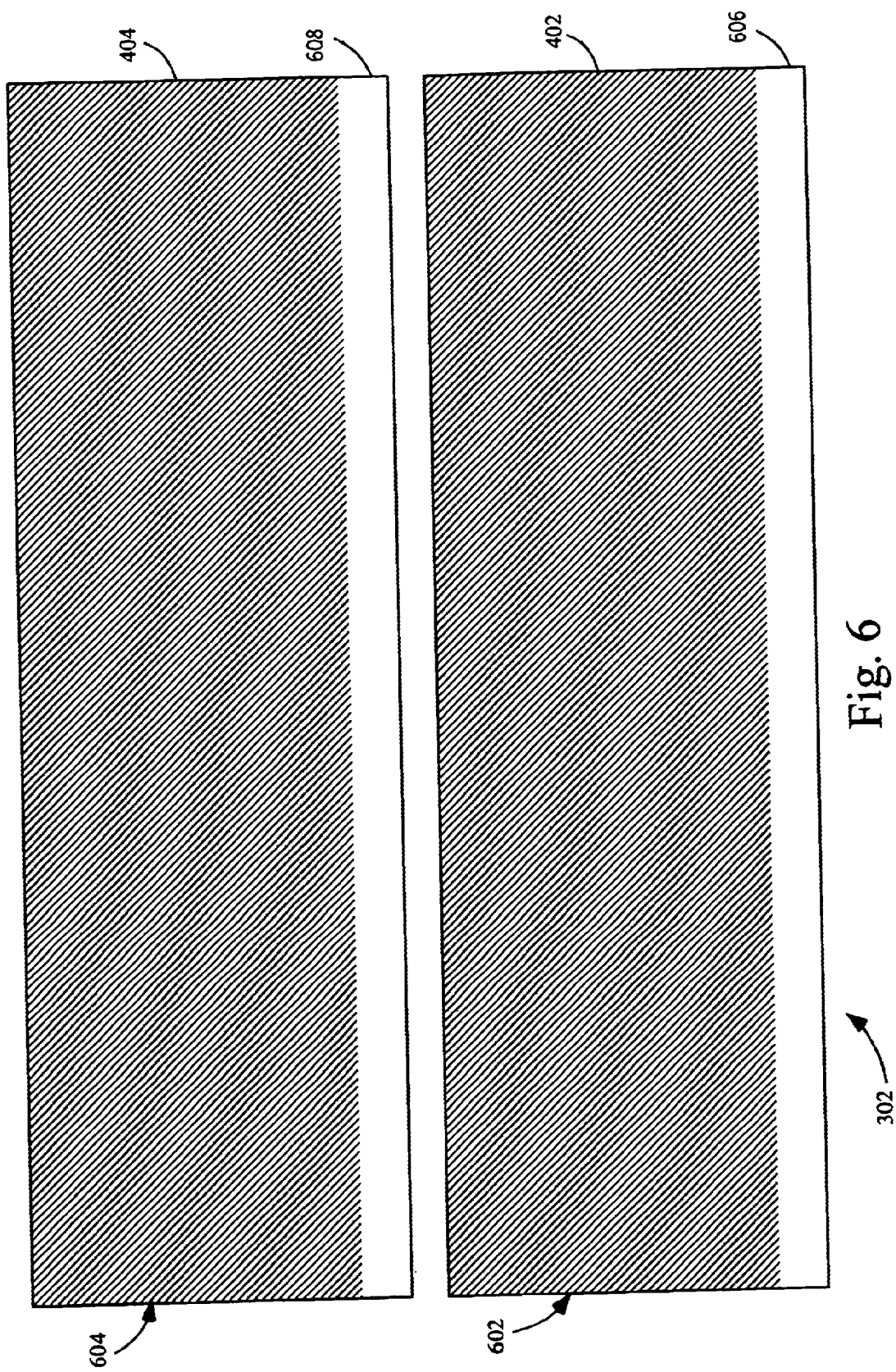
FIG. 6 is a top view of the foil of FIG. 4 having been cut into two foil electrodes, such as the foil electrode in FIG. 1.

Referring to FIG. 6, a top view is shown of the foil 302 of FIG. 4 having been cut into two foil electrodes 602, 604, such as the foil electrode 100 in FIG. 1.

As can be seen, each of the two foil electrodes 602, 604 comprises the region 402, 404 coated with the first layer of conducting carbon and the second layer of activated carbon; and the contact edges 606, 608.

Figure 7:
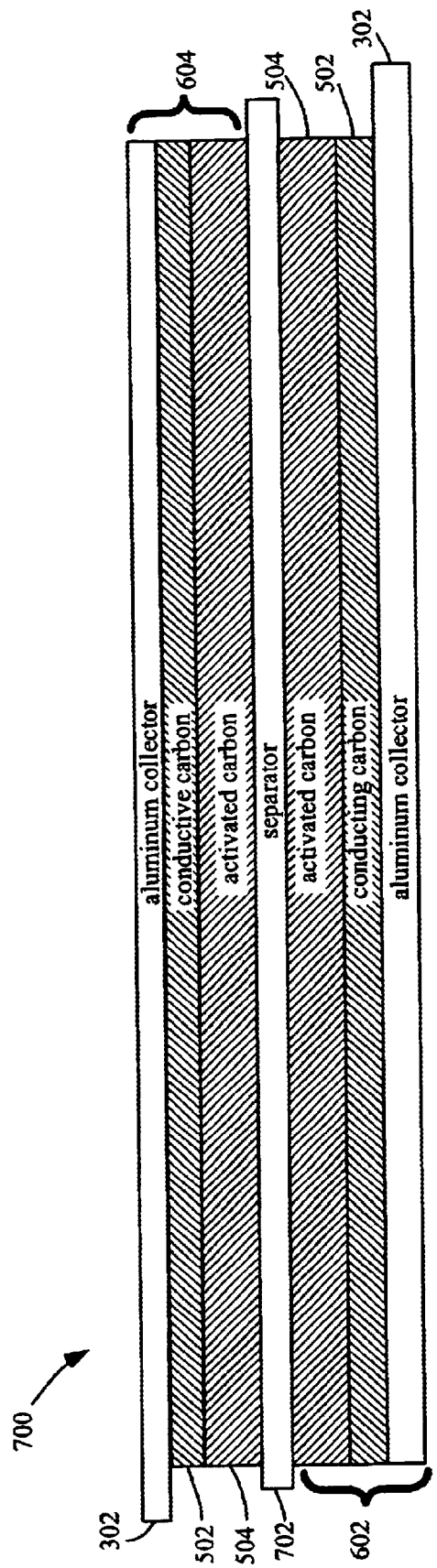
FIG. 7 is a side cross-sectional view of two foil electrodes having their respective second layers of activated carbon juxtaposed against a porous separator, so as to form first and second carbon electrodes electrically (but not ionically) isolated from one another by the porous separator.

Referring next to FIG. 7, a side cross-sectional view is shown of the two foil electrodes 602, 604 having their respective second layers 504 of activated carbon juxtaposed against a porous separator 702, so as to form first and second carbon electrodes 602, 604 electrically (but not ionically) isolated from one another by the porous separator 702.

The purpose of the porous separator 702 is to assure that the two spaced-apart carbon electrodes 602, 604 are never in direct electrical contact with one another (as opposed to ionic flow, which is permitted by the porous separator 702).

The term "spaced-apart" is intended to refer to this lack of direct electrical contact between the electrodes 602, 604. A secondary purpose of the porous separator 702 is to enhance electrolyte solution absorption into the space between the two-spaced apart electrodes 602, 604.

This purpose is important to the present embodiment, because contact between the two spaced-apart carbon electrodes 602, 604 would result in a short circuit and rapid depletion of the charges stored in the electrochemical double layer capacitor 700.

Thus, provided the purpose of preventing direct electrical contact between the foil electrodes 602, 604 is fulfilled, a wide range of materials and/or structures may be used as the porous separator 702, including, for example, mechanically spacing the two spaced apart carbon powder electrodes 602, 604, without a physical barrier interposed between the two spaced apart carbon powder electrodes 602, 604.

The porous separator 702 may be, for example, TF3045 paper available from Nippon Kodoshi Corporation of Japan. The porous separator 702, alternatively, may be made of polyethylene, polypropylene, other types of paper, combinations or laminations thereof or the like. Thickness of the porous separator 702 may be, for example, from between 1 to 50 micrometers, e.g., 35 micrometers; density may be, for example, from between 0.3 to 0.5 grams per centimeter cubed, e.g., 0.419 grams per centimeter cubed; tensile strength may be, for example, greater than 10 Newtons per 15 millimeters, e.g., 12.7 Newtons per 15 millimeters; porosity may be, for example, 40 to 80 percent, e.g., 72 percent; electrolyte absorbency, for example, 10 to 80 millimeters per 10 minutes, e.g., 39 millimeters per 10 minutes; and thermal stability may be −55 degrees Celsius to 150 degrees Celsius.

In accordance with a preferred embodiment, the illustrated components are compressed against each other with a modest constant pressure, with the porous separator 702 preventing an electrical short, i.e., direct electrical contact, between the foil electrodes 602, 604.

In practice, all of the available spaces and voids within and between the two carbon electrodes 602, 604 (two foil electrodes 602, 604) are filled with a highly conductive, preferably non-aqueous electrolyte solution, such as tetra ethylammonium tetra fluoroborate ($Et_4NBF_4$) ($TEABF_4$) salt with acetonitrile ($CH_3CN$) as a solvent.

Other possible salts include Triethyl methyl ammonium and other alkyl ammonium salts.

Other possible solvents include propylene carbonate (PC), ethylmethyl carbonate (EMC), ethylene carbonate (EC), dimethyl carbonate (DMC), methyl formate and their mixtures.

It is to be emphasized, that the invention herein described contemplates the use of alternate electrolyte solutions, particularly non-aqueous (or organic) electrolyte solutions, other than the solution made from acetonitrile described above.

The electrolyte solution should preferably have a conductivity of, e.g., from between 10 to 100 milli-Siemens, e.g., 66 milli-Siemens; a liquidous range of, e.g., from between −55 to 200 degrees Celsius, e.g., −55 to 87 degrees Celsius; and a voltage range of greater than 2 volts.

The ions of the electrolyte solution are free to pass through pores or holes of the porous separator; yet, as mentioned above, the separator prevents the one electrode from physically contacting, and hence electrically shorting with, the other electrode.

In operation, when an electrical potential is applied across the contact edges of the carbon electrodes, and hence across the carbon electrodes 602, 604, a polarized liquid layer forms at the surface of each electrode immersed in the electrolyte. It is this polarized liquid layer that stores electrostatic energy and functions as the double layer capacitor—i.e., that functions as two capacitors in series.

More specifically, when a voltage is applied across the carbon electrodes 602, 604, e.g., when one electrode 602 is charged positive relative to the other electrode 604, a polarized liquid layer is formed by the polarization of the electrolyte ions due to charge separation under the applied electric field and also due to the dipole orientation and alignment of electrolyte molecules over the entire surface of the electrodes 602, 604. This polarization stores energy in the capacitor according to the following relationships:

$$C = k_e A/d \quad (1)$$

and $$E = CV^2/2 \quad (2)$$

where C is the capacitance, $k_e$ is the effective dielectric constant of the double layer, d is the separation distance between the layers, A is the surface area of the foil electrodes 602, 604 that are immersed in the electrolyte solution, V is the voltage applied across the foil electrodes 602, 604, and E is the energy stored in the electrochemical double layer capacitor 702.

In the present embodiment, the separation distance d is so small that it is measured in angstroms, while the surface area A, i.e., the surface area "A" per gram of electrode material, is very large. Hence, as can be seen from Eq. (1), when d is very small, and A is very large, the capacitance is very large.

The surface area "A" in the electrochemical double layer capacitor 702 is large because of the make-up of the foil electrodes 602, 604. Specifically, each of the foil electrodes 602, 604 comprises activated carbon powders in the secondary coating 504, respectively. Activated carbon is a highly porous form of carbon. The activated carbon powders do not have a smooth surface, but are pitted with numerous pores. The pores of the activated carbon powders have a typical size of about 5 to 40 Å (Angstroms).

The carbon electrodes 602, 604 are immersed in the electrolyte solution. Each hole and pore increases the surface area of the powder that is exposed to the electrolyte solution. The result is a three-dimensional electrode structure which allows the electrolyte to penetrate into the pores, and contact all, or most all, of the surface area of the carbon powders, thereby dramatically increasing the surface area "A" of the electrode over which the double layer of charged molecules is formed.

Achieving a high capacitance, however, is only one aspect of the present embodiment. As noted above, another important aspect of the present embodiment is that the electrochemical double layer capacitor is capable of storing and discharging energy in a relatively short time period, i.e., the RC time constant of the electrochemical double layer capacitor 702 is relatively small, e.g., on the order of less than 1 second, e.g., 0.5 seconds.

The internal resistance of the electrochemical double layer capacitor 702 is made up of several components. Specifically, the internal resistance components include a contact resistance $R_C$, an electrode resistance $R_{EL}$, an electrolyte solution resistance $R_{ES}$, and a separator resistance $R_{SEP}$.

The contact resistance $R_C$ represents all of the resistance in the current path from the capacitor terminal (not shown) up to the contact edge of the carbon electrode 602, 604. The electrode resistance $R_{EL}$ represents the resistance within the electrodes 602, 604. The electrolyte solution resistance $R_{ES}$ exists relative to the electrolyte solution, and the separator resistance $R_{SEP}$ exists relative to the porous separator 702.

Figure 12:
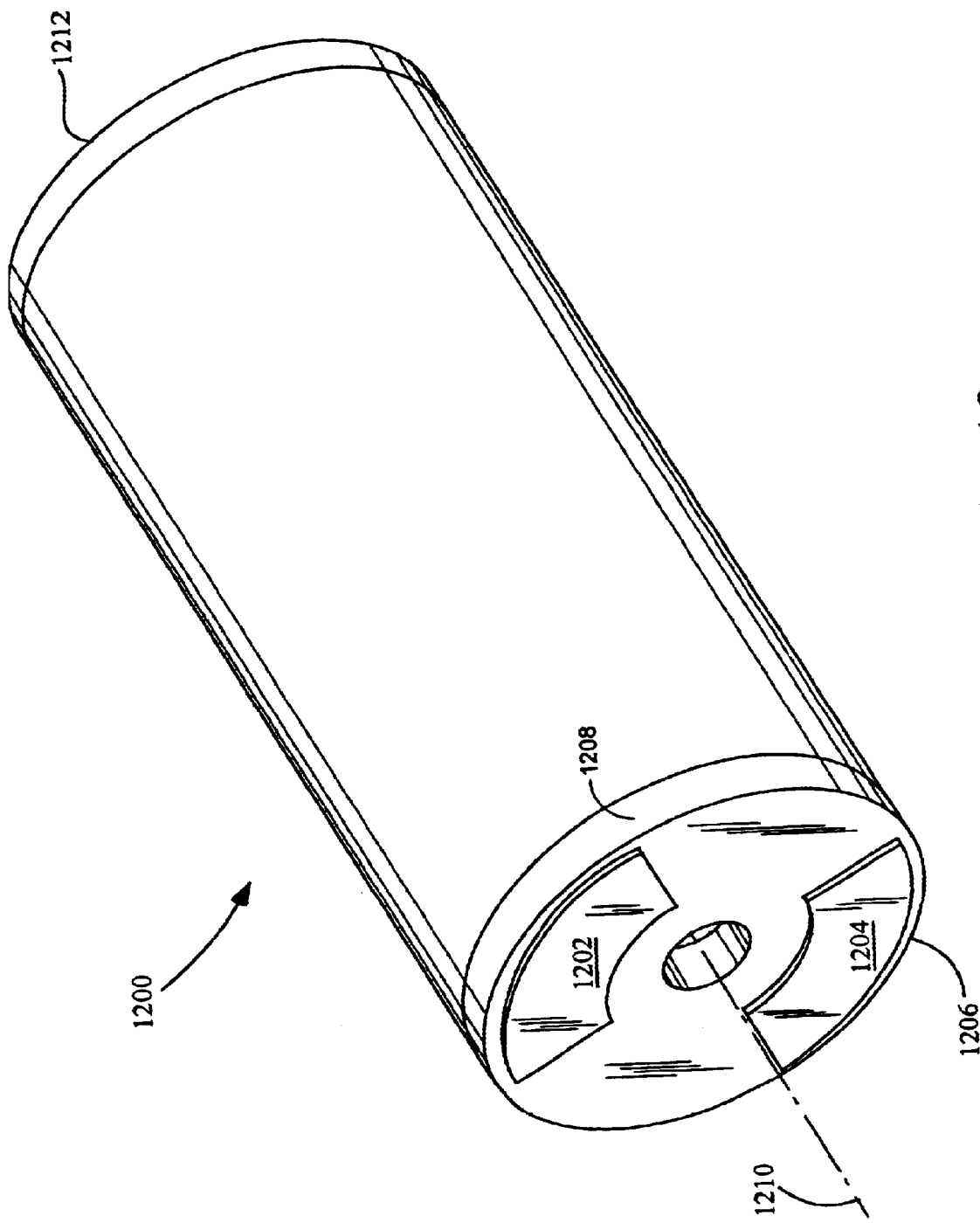
FIG. 12 is a perspective view of the "jellyroll" electrode assembly of FIG. 10 including with aluminum arc sprayed regions at an end of the "jellyroll" electrode assembly so as to provide a low resistance path between contact edges of the first carbon electrode, and including additional arc sprayed regions at an opposite end of the "jellyroll" electrode assembly so as to provide another low resistance path between contact edges of the second carbon electrode.

The forgoing description has focused principally on teachings of the present embodiment directed to minimizing the electrode resistance $R_{EL}$, although the electrolyte solution and the porous separator 702, described above, are selected to minimize the electrolyte solution resistance $R_{ES}$ (balanced against the voltage that the electrolyte solution will tolerate, as described further herein below) and separator resistance $R_{SEP}$, respectively. Description hereinbelow, beginning in reference, for example, to FIG. 12 is directed to teachings for minimizing contact resistance $R_C$.

Any energy stored within the electrochemical double layer capacitor 700 enters or exits the capacitor by way of an electrical current that flows through $R_C$, $R_{EL}$, $R_{ES}$, and $R_{SEP}$. Thus it is seen that in order for practical charge/discharge times to be achieved, the values of $R_C$, $R_{EL}$, $R_{ES}$, and $R_{SEP}$, which in combination with the capacitance C define the time constant $\tau_C$ of the capacitor 100, are preferably kept as low as possible.

The resistance of the porous separator $R_{SEP}$ is a function of the porosity and thickness of the porous separator 702.

The resistance of the electrolyte solution $R_{ES}$ is a function of the conductivity of the particular electrolyte solution used. In selecting the type of electrolyte solution, several tradeoffs are considered. Aqueous electrolyte solutions generally have a higher conductivity than do non-aqueous solutions (e.g., by a factor of 10). However, aqueous solutions limit the working voltage of the capacitor cell to around 1.0 volt. Because the energy stored in the cell is a function of the square of the voltage, high-energy applications are better served using a non-aqueous electrolyte, which permit cell voltages on the order of 2.0 to 3.0 volts.

The preferred electrolyte, a mixture of acetonitrile ($CH_3CN$) and a suitable salt, exhibits a conductivity on the order of 60 $ohm^{-1}$ $cm^{-1}$.

A result of the present embodiment is that $R_C + R_{EL}$ are reduced to a value that is small in comparison to $R_{SEP} + R_{ES}$.

Figure 8:
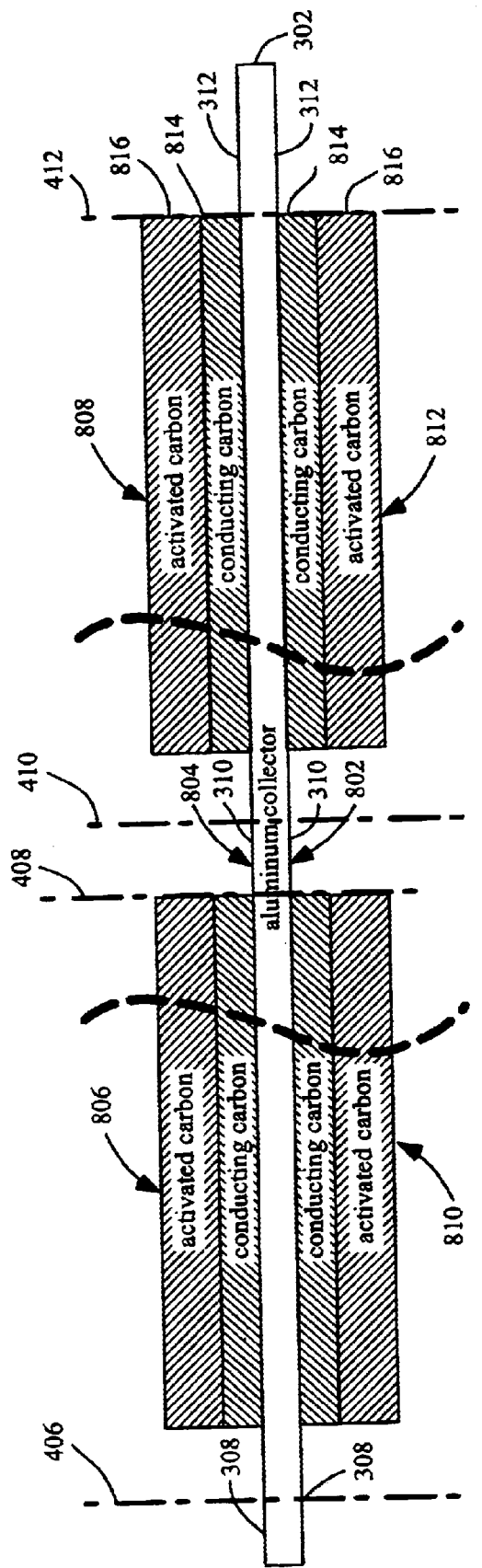
FIG. 8 is a side cross-sectional view of the foil of FIG. 4 wherein both first and second sides of the foil include regions having the first layer of conducting carbon and the second layer of activated carbon, and further include three lanes of the foil separated by the regions coated with the first layer of conducting carbon and a second layer of activated carbon.

Referring to FIG. 8, a side cross-sectional view is shown of the foil 302 of FIG. 4 wherein both first and second sides 802, 804 of the foil 302 include regions 806, 808, 810, 812 having the first layer of conducting carbon 814 and the second layer of activated carbon 816, and further include the three lanes 308, 310, 312 of the foil 302 separated by the regions 806, 808, 810, 812 coated with the first layer of conducting carbon 814 and a second layer of activated carbon 816.

The embodiment of FIG. 8 is identical to the embodiment of FIGS. 5 and 7, except that instead of having the first layer 814 and the second layer 816 (and the three lanes of foil 308, 310, 312 without the first layer 814 and the second layer 816) on only one side of the foil, the first layer 814 and the second layer 816 are formed on both sides 802, 804 of the foil 302, effectively doubling the amount of carbon present in the foil electrode, and thereby increasing the capacitance of the electrochemical double layer capacitor.

The foil 302 of FIG. 8 is made in accordance with the process described above in reference to FIGS. 2 through 4, except that the foil 302 passes through the slurry transfer apparatus 200 (FIG. 2) two additional times (or passes through two additional slurry transfer apparatus, inline with an initial two slurry transfer apparatus 200) so that a total of four layers of carbon are deposited onto the foil 302, two layers 814, 816 on each side 802, 804. The foil 302 is inverted after the first layer 814 and the second layer 816 are formed on the first side 802, so that a first layer 814 and a second layer 816 can be formed on the second side 804 of the foil 302.

Alternatively, the foil 302 may be inverted after the first layer 814 is formed on the first side 802, so that the first layer 814 on the second side 804 can be formed; thereafter the foil 302 is inverted again so that the second layer 816 can be formed on the first side 802; and, finally, the foil 302 is again inverted so that the second layer 816 on the second side 804 can be formed.

The foil 302, having a first layer 814 and a second layer 816 on each side 802, 804 is then cut along the cut lines 406, 408, 410, 412 depicted, as described above in reference, for example, for FIGS. 4 through 6.

Other possible methods of making the carbon electrodes include employing perforated foil collector plates or screens (not shown). The carbon slurry may be coated onto the perforated foil collector plates or screens through an extrusion process using a die, thus enabling the coating process to be completed in two steps (one for the first layer on both sides of the perforated foil collector plates or screens, and another for the second layer on both sides of the perforated foil collector plates or screens), minimizing the number of process steps thus lowering cost.

Figure 9:
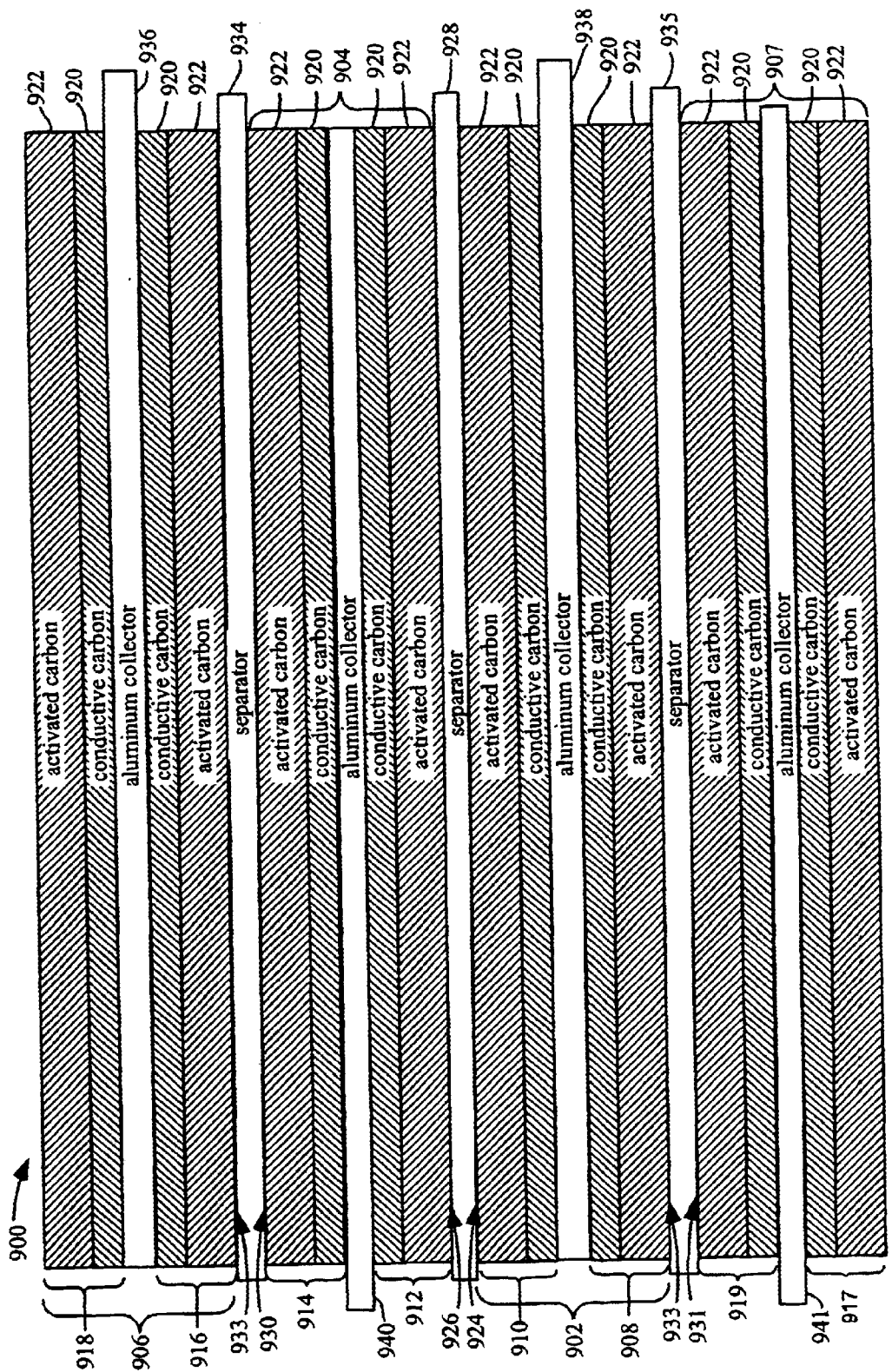
FIG. 9 is a side cross-sectional view of four foil electrodes, such as in FIG. 8, having first and second sides including the first layer of conducting carbon and the second layer of activated carbon, with one second layer of activated carbon of first and second ones of the foil electrodes juxtaposed against respective sides of a first porous separator, and another second layer of activated carbon of second and third ones of the foil electrodes juxtaposed against respective sides of a second porous separator, so as to form first, second and third carbon electrodes electrically (but not jonically) isolated from one another by the first and second porous separators.

Referring next to FIG. 9, a side cross-sectional view is shown of four foil electrodes 902, 904, 906, 907 such as in FIG. 8, having first and second sides 908, 910, 912, 914, 916, 918, 917, 919 including the first layer of conducting carbon 920 and the second layer of activated carbon 922, with the second layer of activated carbon 922 of first and second ones of the foil electrodes 902, 904 juxtaposed against respective sides 924, 926 of a first porous separator 928; another second layer of activated carbon 922 of second and third ones of the foil electrodes 904, 906 juxtaposed against respective sides 930, 932 of a second porous separator 934; and a further second layer of activated carbon 922 of first and fourth ones of the foil electrodes 902, 907 juxtaposed against respective sides 931, 933 of a third porous separator 935 so as to form first, second, third and fourth carbon electrodes 902, 904, 906, 907 electrically (but not ionically) isolated from one another by the first, second and third porous separators 928, 934, 935.

The four foil electrodes 902, 904, 906, 907 and the porous separators 928, 934, 935 are immersed in the electrolyte solution, and function similarly to the foil electrodes 602, 604 separator 702 and electrolyte solution described in reference, for example, to FIG. 7. Note, however, that the first and third ones of the foil electrodes 902, 906, have their contact edges 936, 938 (to the right as depicted) electrically connected, i.e., shorted (not shown), so that such first and third ones of the foil electrodes 902, 906 serve as one electrode of the electrochemical double layer capacitor 900, and the second and forth ones of the foil electrodes 904, 907 have their contact edges 940, 941 (to the left as depicted) electrically connected, i.e., shorted (not shown), so that such second and fourth ones of the foil electrodes 904, 907 serve as another electrode of the electrochemical double layer capacitor 900.

Figure 10:
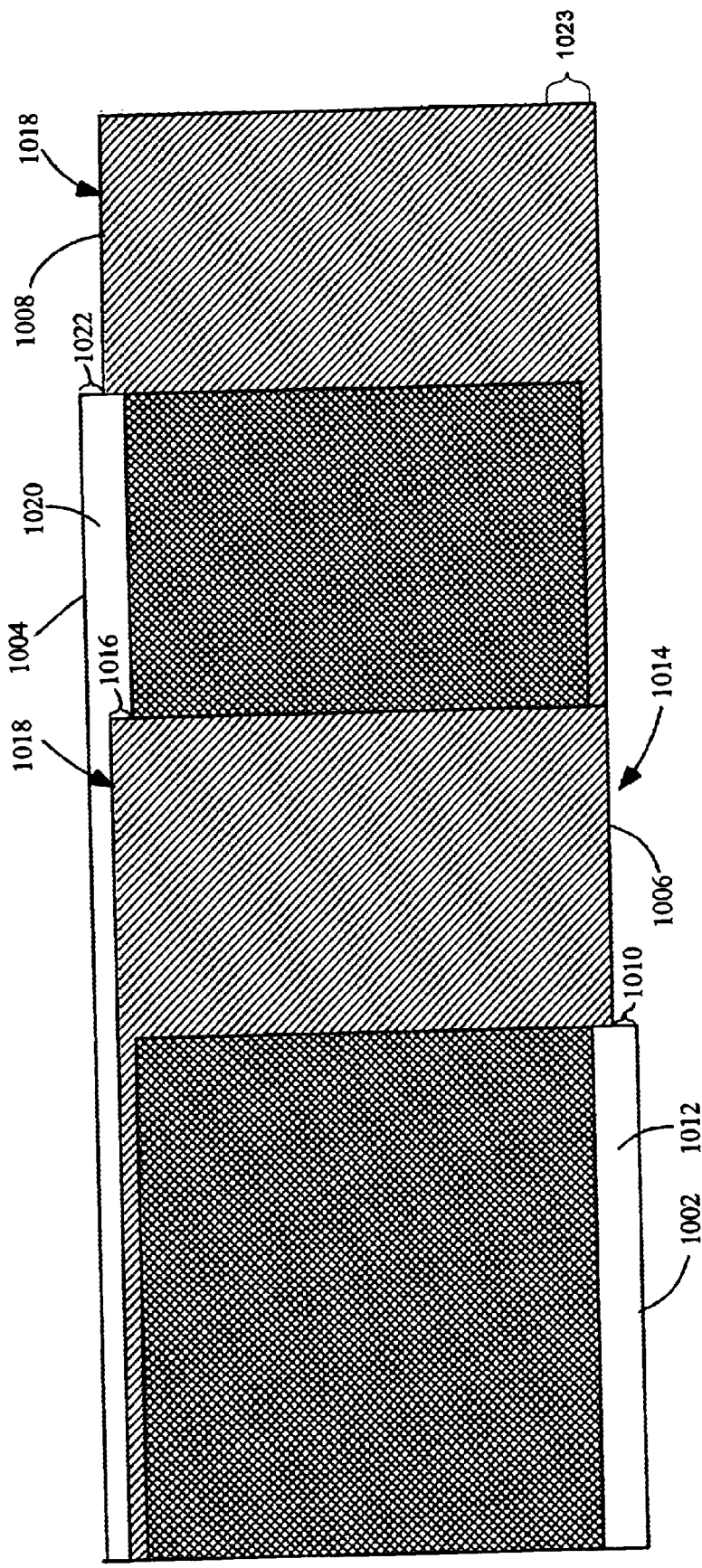
FIG. 10 is a partial top view illustrating windings comprising a pair of the carbon electrodes, such as in FIG. 8, having first and second sides including the first layer of conducting carbon and the second layer of activated carbon, and being separated by a porous separator.

Referring to FIG. 10, a partial top view is shown illustrating winding layers comprising a pair of the carbon electrodes 1002, 1004, such as in FIG. 8, having first and second sides including the first layer of conducting carbon and the second layer of activated carbon, and being separated by the first and second porous separators 1006, 1008.

Shown is a first foil electrode 1002, a first separator 1006, a second foil electrode 1004, and a second separator 1008. As can be seen, the first foil electrode 1002 and the second foil electrode 1004, e.g., the positive foil electrode 1002 and the negative foil electrode 1004, are offset from the first separator 1006 and the second separator 1008, and are positioned on opposite sides, e.g., top and bottom sides, of the first separator. (This difference in width and the relationship between the foil electrodes and the separators can also be seen in FIG. 9.) The second separator 1008 is positioned under the second foil electrode 1004 so that when the first and second separators 1006, 1008, and the first and second foil electrodes 1002, 1004 are rolled together, opposite sides of the first and second separators 1006, 1008 provide insulation between adjacent sides of the first foil electrode 1002 and the second foil electrode 1004.

Advantageously, the first and second foil electrodes 1002, 1004 are double sided, as depicted in FIG. 8, in that they have been coated with the first and second layers on both sides. In this way, the amount of carbon in each electrode is effectively doubled.

When the first foil electrode 1002 is placed against the first separators 1006, a portion 1010 of a contact edge 1012 of the first foil electrode 1002 extends beyond a first edge 1014 of the first and second separators 1006, 1008. The portion 1010 of the contact edge 1012 of the first foil electrode 1002 may be, for example, 0.125 inches wide, while the contact edge 1012 of the first foil electrode 1002 may be, for example, 0.250 inches wide.

At the same time, a portion 1016 of the first and second porous separators 1006, 1008 at an opposite edge 1018 of the first and second porous separators 1006, 1008 extends beyond the first foil electrode 1002 in order to prevent shorting of the first foil electrode 1002 with a contact edge 1020 of the second foil electrode 1004. The portion 1016 of the first and second separators 1006, 1008 may be, for example, 0.125 inches wide.

A portion 1022 of the contact edge 1020 of the second foil electrode 1004 extends beyond the opposite edge 1018 of the first and second separators 1006, 1008, e.g., by 0.125 inches, and a portion 1023 of the first and second porous separators 1006, 1008 at the first edge 1014 of the first and second porous separators 1006, 1008 extends beyond the second foil electrode 1004, e.g., by 0.125 inches, in order to prevent shorting of the second foil electrode 1004 with the contact edge 1012 of the first fail electrode 1002. The contact edge 1020 of the second foil electrode 1004 may be, for example, 0.250 inches wide.

Portion 1010, 1022 of the contact edges 1012, 1020 of the first foil electrode 1002 and second foil electrode 1004 that extend beyond the first and second (or opposite) edges 1014, 1018, respectively, of the first and second separators 1006, 1008 serve as points of contact for the first foil electrode 1002 and second foil electrode 1004, respectively.

Figure 11:
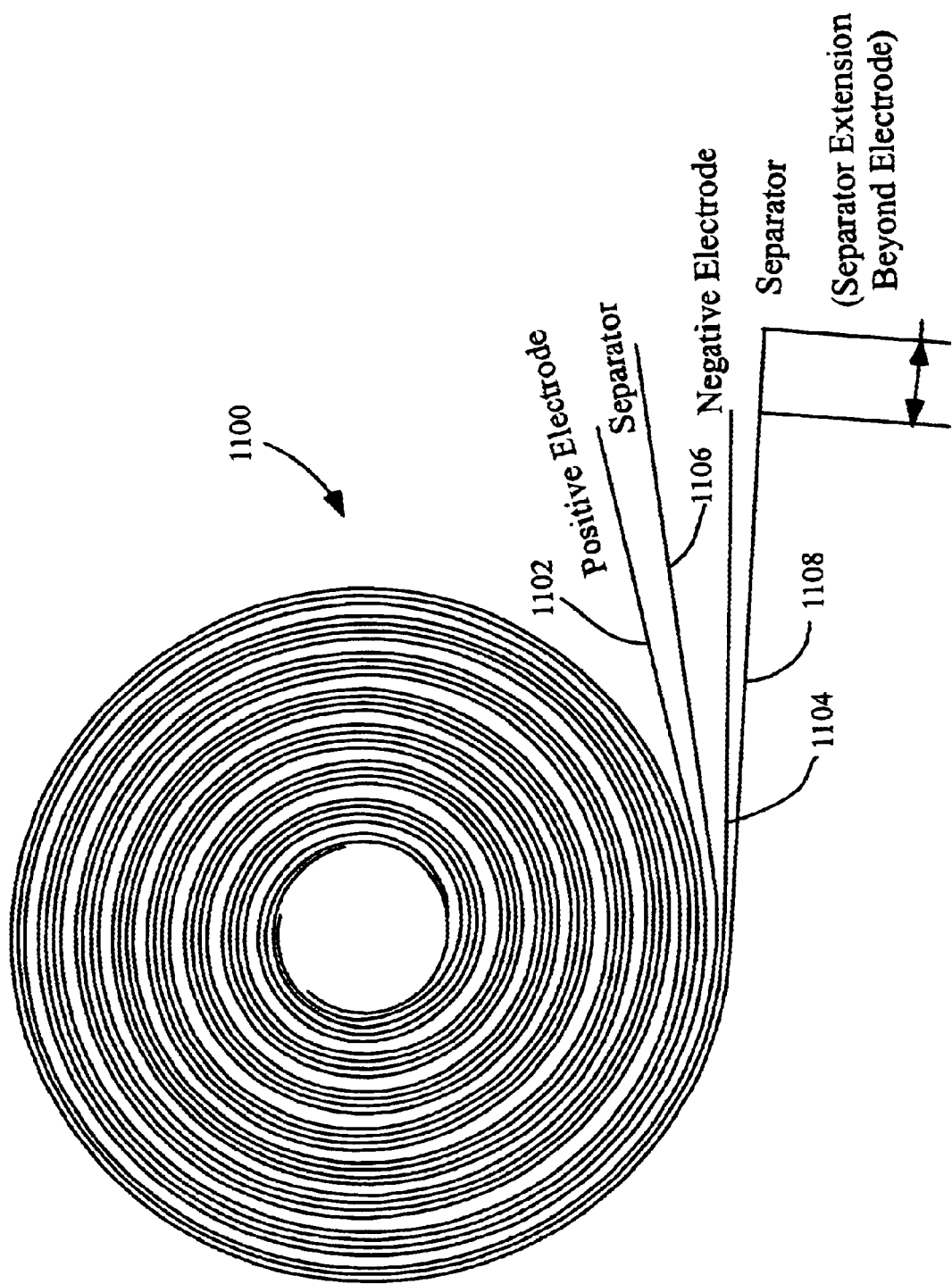
FIG. 11 is an end assembly cross-sectional view of a "jellyroll" electrode assembly comprising a pair of the carbon electrodes, such as in FIG. 8, having first and second sides including the first layer of conducting carbon and the second layer of activated carbon, and being separated by a first and second porous separator in accordance with a "jellyroll" embodiment employing the winding layers of FIG. 10.

FIG. 11 is an end, assembly cross-sectional view of a "jellyroll" electrode assembly 1100 comprising a pair of the carbon electrodes 1102, 1104, such as in FIG. 8, having first and second sides including the first layer of conducting carbon and the second layer of activated carbon, and being separated by first and second porous separators 1106, 1108 in accordance with a "jellyroll" embodiment employing the winding layers of FIG. 10.

Shown is the first foil electrode 1102, the second foil electrode 1104, the first separator 1106, and the second separator 1108. As can be seen, layers comprising the first separator 1106, the first foil electrode 1102, the second separator 1108, and the second foil electrode 1106 are rolled in a "jellyroll" fashion such that each of two coated surfaces of the first foil electrode 1102 and the second foil electrode 1104 are separated by the first and second separators 1106, 1108, respectively, thereby maximizing surface area per unit volume and maximizing capacitance.

The two foil electrodes 1102, 1104 are offset (as described further hereinabove, so as to leave their respective contact edges extending beyond first and second edges of the first and second separators 1106, 1108) and assembled into a jellyroll configuration electrically separated from each other by the first separator 1106 and the second separator 1108, which can be a polymer film or paper.

Preferably, the first separator 1106 and the second separator 1108 extend beyond ends of the first electrode 1102 and the second electrode 1104 (as described further hereinabove), to prevent "shorting," i.e., electrical current from flowing between the first foil electrode 1102 and the second foil electrode 1104.

Referring next to FIG. 12, a perspective view is shown of the "jellyroll" electrode assembly 1100 of FIG. 11 including with aluminum arc sprayed regions 1202, 1204 at an end 1206 of the "jellyroll" electrode assembly 1200 so as to provide a low resistance path to the contact edge 1208 of the first carbon electrode, and including additional arc sprayed regions (not shown) at an opposite end of the "jellyroll" electrode assembly 1200 so as to provide another low resistance path to the contact edges of the second carbon electrode.

Shown is the "jellyroll" electrode assembly 1200, the second separator, the contact edge 1208 of the first foil electrode, the contact edge of the second foil electrode, a first aluminum region 1202 and a second aluminum region 1204 on the contact edge 1208 of the first foil electrode.

The "jellyroll" electrode assembly 1200 is formed by winding or rolling the first foil electrode, the second foil electrode, the first separator, and the second separator, as described hereinabove.

Once the "jellyroll" electrode assembly 1200 is formed, the contact edge 1208 of the first electrode and the contact edge of the second electrode are "smeared" by applying a slight pressure against the respective contact edges, both axially and radially toward a center of the "jellyroll" electrode assembly 1200. As a result of this "smearing" the contact edges are bent radially toward a center 1210 of the "jellyroll" electrode assembly 1200, which tends to expose surfaces of the contact edge 1208 of the first electrode and the contact edge of the second electrode and to close gaps between windings at the contact edge 1208 of the first electrode and between windings of the contact edge of the second electrode.

Once "smearing" of the contact edges 1208 is complete, the first end 1206 and second end 1212 of the "jellyroll" electrode assembly 1200 are masked, so that two sectors of each of the first and second ends 1206, 1212 are exposed, while a remainder of the first and second ends 1206, 1212 are masked. The two sectors extend from an outside corner edge of the "jellyroll" electrode assembly 1200 and extend radially about two thirds of the way to a center axis 1210 of the "jellyroll" electrode assembly 1200. Each sector is about 45° wide.

Once the first end 1206 of the "jellyroll" electrode assembly 1200 is masked, the first end 1206 is arc sprayed with aluminum or another electrically conductive material compatible with the electrolyte solution. Once the arc spraying is complete, the masks are removed from the first end 1206. One purpose of the arc spraying of the first end 1206 of the "jellyroll" electrode assembly 1200 is to provide a low resistance current path between windings (i.e., between contact edges) of the first foil electrode, thus reducing overall electrode resistance.

First and second aluminum regions (not shown) are also formed at the second end of the "jellyroll" electrode assembly in a manner similar to that in which first and second aluminum regions 1202, 1204 are formed at the first end of the "jellyroll" electrode assembly 1200, providing a low resistance current path between windings (i.e., between contact edges of the second electrode, thus further reducing overall electrode resistance.

In order to create a low resistance contact, a collector disk (not shown) and a terminal post (not shown) are aligned with and placed against each of the ends of the "jellyroll" electrode assembly 1200 so as to place the collector disk into electrical contact with the contact edges of the foil electrode at the respective end of the "jellyroll" electrode assembly 1200, and with the first and second aluminum regions 1202, 1204 at the respective end of the "jellyroll" electrode assembly 1200.

The collector disk is then attached to the end of the "jellyroll" electrode assembly 1200 at the first and second aluminum regions by laser welding, thus providing a low resistance contact between the end of the "jellyroll" electrode assembly 1200 and the terminal assembly. As a result, a low resistance contact is provided between the first foil electrode and the first terminal assembly and the second foil electrode and the second terminal assembly.

Alternatively, the first terminal assembly and the second terminal assembly may be aligned with and placed against the ends of the "jellyroll" electrode assembly 1200 prior to the formation of the first and second aluminum regions, in which case the arc spraying of the first and second aluminum regions serves to "weld" the collector disks into electrical contact with the contact edges of the first and second foil electrodes.

In one variation, when the collector disks are seated against the aluminum coated regions of the ends of the "jellyroll" electrode assembly 1200, and when the amount of aluminum at the aluminum coated regions is sufficient to raise the collector disks above remaining contact edges of the ends of the "jellyroll" electrode assembly 1200, thereby creating a small gap between the collector disks and the contact edges, this allows the electrolyte solution to flow beneath the collector disks and then to flow between the windings of the "jellyroll" electrode assembly 1200 that lie beneath the collector disks.

Preferably the collector disks are seated against both the coated regions and the uncoated regions of the ends of the "jellyroll" electrode assembly 1200, with sufficient electrolyte solution being permitted to flow between the collector disks and the ends of the "jellyroll" electrode assembly 1200 to permit the electrolyte solution to flow between the windings of the "jellyroll" electrode assembly 1200 that lie between the collector disks.

Referring to FIG. 13, a side cross-sectional view is shown of the "jellyroll" electrode assembly 1200 of FIG. 12, having the winding layers of FIG. 11.

Shown is the "jellyroll" electrode assembly 1200 made up of the windings, the contact edge 1302 of the first foil electrode, the contact edge 1304 of the second foil electrode, and a hollow core 1306.

In order to form the "jellyroll" electrode assembly's winding layers, the first and second foil electrodes, and the first and second separators, as described herein, are wound, as described herein.

Referring to FIG. 14, is a side cross-sectional view of the "jellyroll" electrode assembly 1200 of FIG. 12, having the winding layers of FIG. 11, and further having a first stud 1402 (or plug 1402), and a first collector disk 1404.

Shown are the windings, the contact edge 1302 of the first foil electrode, the contact edge 1304 of the second electrode, the hollow core 1306, and the first stud 1402, and the first collector disk 1404.

The first stud 1402 is aligned with a first end of the hollow core 1306, and is inserted into an opening at the end of the hollow core 1306, a threaded post 1406 extends from the stud 1402, away from the hollow core 1306.

When the stud 1402 is inserted into the opening at the end of the hollow core 1306, the first collector disk 1404 seats against the first end of the "jellyroll" electrode assembly 1200 including the first and second aluminum regions of the first end of the "jellyroll" electrode assembly 1200, and is laser welded to the first end of the "jellyroll" electrode assembly 1200, including the first and second aluminum regions of the first end of the "jellyroll" electrode assembly 1200.

Referring next to FIG. 15, a side cross-sectional view is shown of the "jellyroll" electrode assembly 1200 of FIG. 12, having the winding layers of FIG. 11, and the first plug 1402 of FIG. 14, and further having a remainder of a first terminal assembly 1502.

Shown are the windings, the contact edge 1302 of the first foil electrode, the contact edge 1304 of the second foil electrode, the hollow core 1306, the first stud 1402, a first collector disk 1404, a first terminal post 1504, and a lid 1506.

The lid 1506 is welded to the first terminal post 1504, which includes a socket, which may be, for example, threaded and formed at a base of the first terminal post 1504. Next, a hole in a center of the collector disk is placed over the threaded post of the first stud 1402, and the first terminal post 1504 is coupled to the threaded post on the first stud 1402 at the socket, such as be screwing the first terminal 1504 post onto the first stud 1402, thereby interposing the collector disk 1404 between the first stud 1402 and the first terminal post 1504.

The first terminal post 1504 (and second terminal post, described below) may have a diameter of approximately 0.625 inches.

Referring to FIG. 16, a side cross-sectional view is shown of the "jellyroll" electrode assembly 1200 of FIG. 12, having the winding layers of FIG. 11, the first plug 1402 of FIG. 14 and the remainder of a first terminal assembly 1502 of FIG. 15, and further having a second plug 1602 (or stud 1602), a second collector disk 1604 and a second terminal post 1606.

Shown is the "jellyroll" electrode assembly's windings, the contact edge 1302 of the first foil electrode, the contact edge 1304 of the second electrode, the hollow core 1306, the first stud 1402, the first collector disk 1404, the first terminal post 1504, the lid 1506, the second stud 1602, the second collector disk 1604, and the second terminal post 1606.

The second stud 1602 includes a threaded post onto which a hole in a center of the second collector disk 1604 is placed, and to which the second terminal post 1606 is coupled, such as by screwing a threaded socket of the second terminal post 1606 onto the second stud 1602. The second stud/collector disk/terminal post 1602/1604/1606 is aligned with a second end of the hollow core 1306.

The second stud 1602 is then inserted into an opening at the second end of the hollow core 1306, and the second collector disk 1604 is seated against the second end of the "jellyroll" electrode assembly 1200 including the first and second aluminum regions of the second end of the "jellyroll" electrode assembly 1200. The second collector disk 1604 is laser welded to the second end of the "jellyroll" electrode assembly 1200, including the first and second aluminum regions of the second end of the "jellyroll" electrode assembly 1200.

Referring to FIG. 17, a side, exploded cross-sectional view is shown of the "jellyroll" electrode assembly 1200 of FIG. 12, having the winding layers of FIG. 11, the first plug 1402 of FIG. 14, the remainder of the first terminal assembly 1502 of FIG. 15 and the second plug 1602, the second collector disk 1604 and the second terminal post 1606 of FIG. 16, and further having a first insulating washer 1702, and a can 1704.

Shown is the "jellyroll" electrode assembly 1200 the contact edge 1302 of the first foil electrode, the 1304 contact edge of the second foil electrode, the hollow core 1306, the first stud 1402, the first collector disk 1404, the first terminal post 1504, the lid 1506, the second stud 1602, the second collector disk 1604, the second terminal post 1606, a first insulating washer 1702 and a can 1704.

The first insulating washer 1702 is placed over the second terminal post 1606. The first insulating washer 1702 may be made from Tefzel. Next, the can 1704 is slid over the "jellyroll" electrode assembly 1200 so that the second terminal post 1606 enters the can 1704 first. The can 1704 may be made, for example, from aluminum and have a wall thickness of 0.04 inches. The diameter of the can 1704 may be for example 2.5 inches, and the length of the can may be for example 6 inches. Next, the second terminal post 1606 passes through an axial hole 1706 at an end of the can 1704. A flange on the first insulating washer 1702 prevents electrical contact between the second terminal post 1606 and the axial hole 1706.

Simultaneously, the lid 1506 is drawn into the opening of the can 1704, so that a rim of the lid 1506 sits just inside a lip of the opening of the can 1704. The rim of the lid 1506 is then welded to the lip of the opening of the can 1704.

Figure 18:
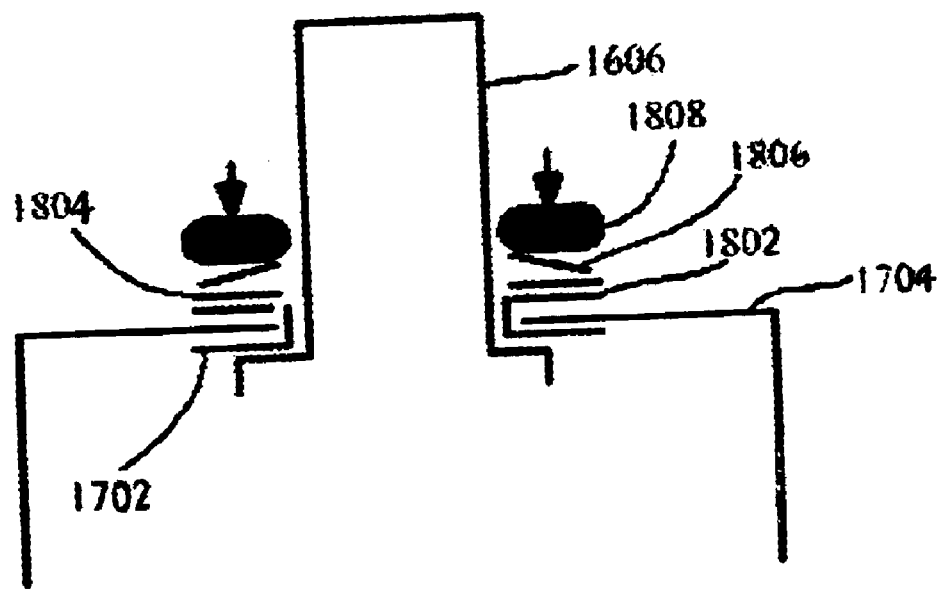
FIG. 18 is a partial side cross-sectional view of the second terminal post 1606 of FIG. 16, and the first insulating washer 1702, and the can 1704 of FIG. 17, and further having a second insulating washer 1802, a flat washer 1804, a Belleville washer 1806 and a locknut 1808.

Referring next to FIG. 18, a partial side cross-sectional view is shown of the second terminal post 1606 of FIG. 16, and the first insulating washer 1702, and the can 1704 of FIG. 17, and further having a second insulating washer 1802, a flat washer 1804, a Belleville washer 1806 and a locknut 1808.

After the second terminal post 1606 passes through the axial hole 1706 (FIG. 17) at an end of the can 1704, the second terminal post 1606 passes through the second insulating washer 1802. The second insulating washer 1802 may also be made from Tefzel. The second terminal post 1606 next passes through the flat washer 1804, and the Belleville washer 1806. The locknut 1808 is then tightened over the Belleville washer 1806, which compresses the Belleville washer 1806 against the flat washer 1804, which in turn is compressed against the second insulating washer 1802. The second insulating washer 1802 is compressed against an exterior periphery of the axial hole 1706 (FIG. 17) in the can 1704, and as the second terminal post 1606 is drawn by this compressive force toward the axial hole 1706 (FIG. 17), the first insulating washer 1702 is compressed between the second terminal post 1606 and an interior periphery of the axial hole.

Referring to FIG. 19, a side cross-sectional view is shown of the "jellyroll" electrode assembly 1200 of FIG. 12, having the winding layers of FIG. 11, the first plug 1402 of FIG. 14, the remainder of the first terminal assembly 1502 of FIG. 15, the second plug 1602, the second collector disk 1604 and the second terminal post 1606 of FIG. 16, the first insulating washer 1702, and the can 1704 of FIG. 17, the second insulating washer 1802, the flat washer 1804, the Bellevile washer 1806 and the locknut 1808 of FIG. 18.

As can be seen, the first insulating washer 1702 and the second insulating washer 1802, including the flange of the first insulating washer, serve to insulate the second terminal post 1606 from the can 1704. The flat washer 1804, and the Belleville washer 1806 are compressed against the second insulating washer 1802 by the locknut 1808, as the second terminal post 1606 is drawn through the hole in the can 1706 to form an hermetic seal between the second terminal post 1606, the first insulating washer 1702, the second insulating washer 1802 and the can 1704. The Belleville washer 1806 assures that this seal is maintained through thermal cycling by providing a spring force against the flat washer 1804 and the locknut 1808.

Figure 20:
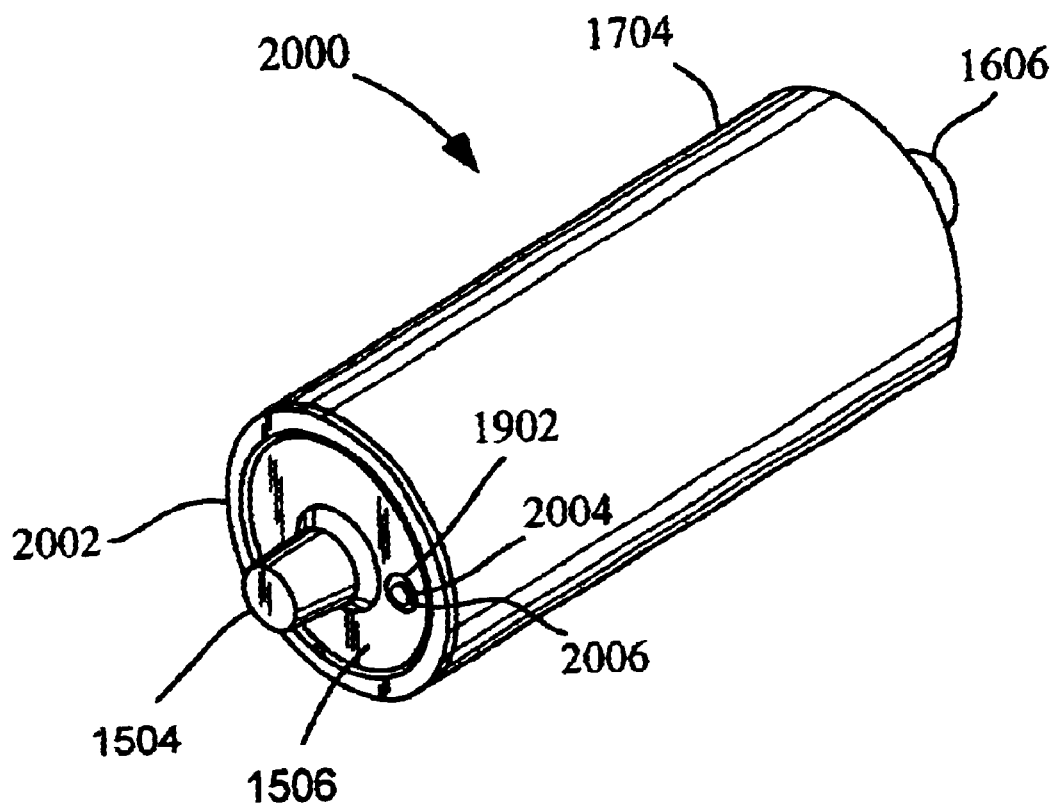
FIG. 20 is a perspective view of an electrochemical double layer capacitor made in accordance with the "jelly-roll" embodiment of FIG. 19.

Referring to FIG. 20, a perspective view is shown of an electrochemical double layer capacitor 2000 made in accordance with the "jellyroll" embodiment of FIG. 19.

Once the locknut 1808 (FIG. 18) is tightened against the Belleville washer 1806 (FIG. 18), as described above, a hermetic seal is formed between the hole 1706 (FIG. 17) in the can 1704, the first insulating washer 1702 (FIG. 18), the second insulating washer 1802 (FIG. 18), and the second terminal post 1606. Similarly, the welding of the lid 1506 to the lip 2002 of the can 1704, and the welding of the lid 1506 to the first terminal post 1504 form another hermetic seal.

A hole 1902 in the lid 1506, however, remains, and serves as a fill port for an electrolyte solution.

In accordance with the present embodiment, the electrolyte solution may be made up of a solvent and a salt. A preferred solvent is acetonitrile ($CH_3CN$) and preferred salts include 1.4M tetraethyl ammonium tetrafluro borate. Other salts may be used, such as, triethyl ammonium, and other alkyl ammonium salts. Other solvents may include propylene carbonate, ethylene carbonate, ethyl methyl carbonate, dimethyl carbonate, methyl formate, and combinations thereof. Preferred electrolyte has a conductivity of from between ten and one hundred milli-Siemens, e.g., 66 mS, a liquidus range of –55 to 200, e.g., –55 to 87 degrees Celsius and a voltage range of greater than 2 volts.

The electrolyte solution is added to the can 1704 through the hole 1902. Evacuation of the can 1704 can be performed prior to the adding of the electrolyte solution, so that the electrolyte solution is drawn (backfilled) into the can and into the jellyroll electrode assembly 1200 (FIG. 13). In particular, the electrolyte solution is drawn into the porous surfaces of the first foil electrode and the second foil electrode made up of the first layer of conductive carbon, and the second layer of activated carbon. Some settling of the electrolyte solution may result in a need for additional electrolyte solution to be added before a plug 2004 and bushing 2006 are inserted into the lid 1506.

The bushing 2006 is then placed into the hole 1902, and is seated against a flange (not shown) at an interior edge of the hole 1902. The bushing 2006 is a hollow cylinder in shape. Next, the plug 2004, which is cylindrical in shape is pressed into a center of the bushing 2006, which presses the bushing 2006 against an interior of the hole 1902, thereby forming a hermetic seal between the hole 1902, bushing 2006, and plug 2004.

Advantageously, the plug 2004 and bushing 2006 may be selected to dislodge when a prescribed level of pressure is reached within the can 1704, thereby providing an overpressure safety mechanism.

Shown are the first terminal post 1504, the lid 1506, the can 1704, the hole 1902 in the lid 1506, the bushing 2006, and the plug 2004. Also, shown is the second terminal post 1606.

Figure 21:
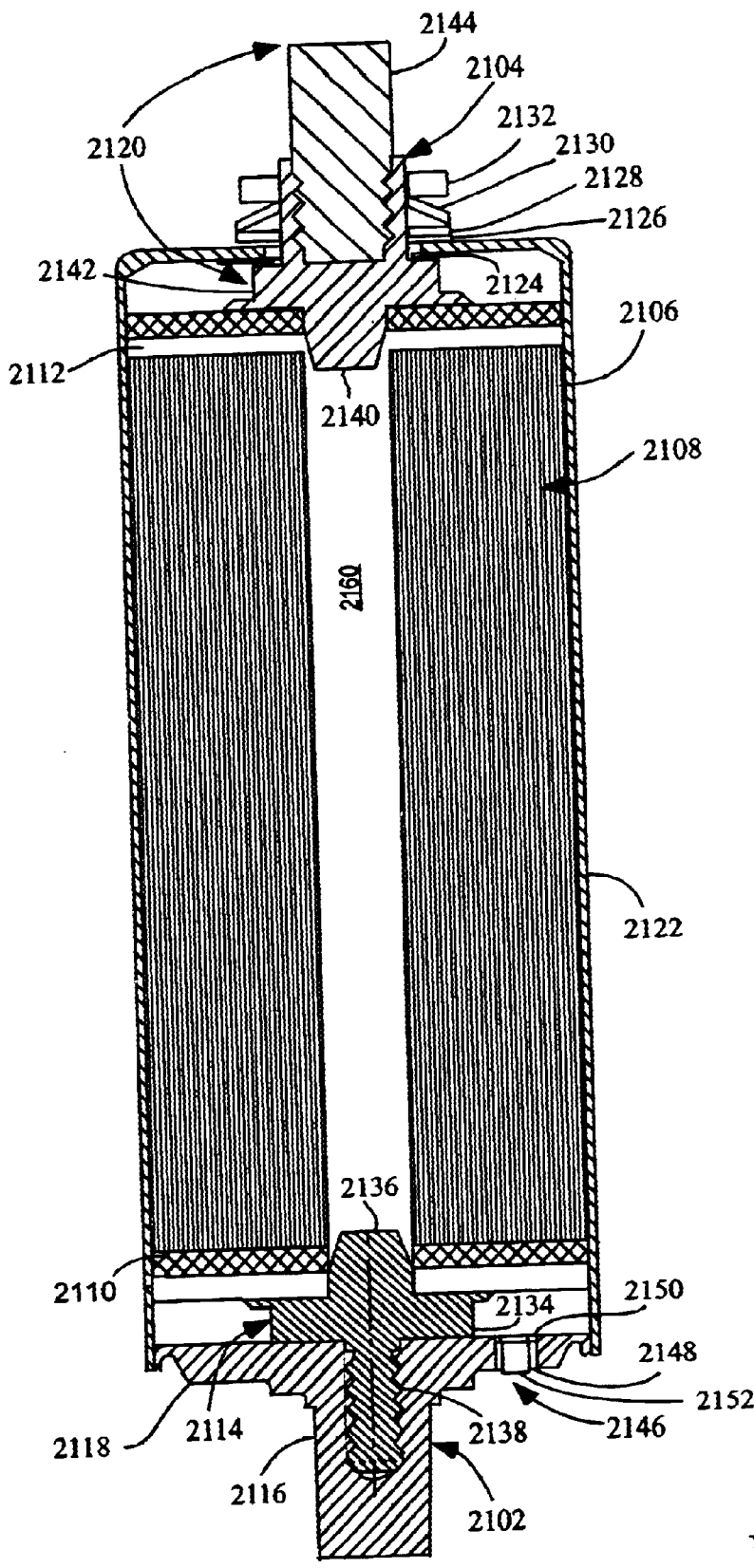
FIG. 21 is a side cross-sectional view of a variation of the "jellyroll" embodiment of FIGS. 12 through 20, having an improved collector plate, and a reduced number of parts in a first terminal assembly, and a second terminal assembly.

Referring next to FIG. 21, a side cross-sectional view is shown of a variation of the "jellyroll" embodiment of FIGS. 12 through 20, having an improved collector plate, and a reduced number of parts in a first terminal assembly 2102, and a second terminal assembly 2120.

An electrochemical double layer capacitor made in accordance with the above-described embodiment may have a capacitance of about 2,650 to 2,700 Farads, with an impedance less than 0.6 milli-ohms.

Shown is the "jellyroll," windings 2106 of the "jellyroll" electrode assembly 2108, the contact edge 2110 of the first foil electrode, the contact edge 2112 of the second foil electrode, the hollow core 2160, a first stud/collector disk 2114, the first terminal post 2116, the lid 2118, the second stud/collector disk/terminal post 2120, the can 2122, a first insulating washer 2124, a second insulating washer 2126, a flat washer 2128, a Belleville washer 2130, and a locknut 2132.

In order to form the "jellyroll" windings 2106 comprising the first and second foil electrodes, and the first and second separators, as described hereinabove, the "jellyroll" windings 2106 are wound, as described hereinabove.

The first stud/collector disk 2114 comprises a disk-shaped portion 2134, a stud portion 2136, and a fastener 2138, such as a screw, formed as a single integral piece. The first/stud collector 2114 is aligned with the first end of the hollow core 2160, and the stud portion 2136 of the first stud/collector disk 2114 is inserted into an opening at the first end of the hollow core 2160.

When a stud portion 2136 of the first stud/collector disk 2114 is inserted into the opening at the first end of the hollow core 2160, the disk-shaped portion 2134 (or collector disk portion 2134) of the first/stud collector disk 2114 seats against the first end of the "jellyroll" electrode assembly 2108 including first and second aluminum coated regions (similar to those shown in FIG. 12) on the first contact edge 2110 of the first end of the "jellyroll" electrode assembly 2108, and is laser welded to the first and second aluminum regions and the first contact edge 2110 of the first end of the "jellyroll" electrode assembly 2108.

The lid 2118 is then welded to the first terminal post 2116, and a socket, which may be for example, threaded, is coupled to the fastener 2138 on the first stud/collector disk 2114, such as by screwing the first terminal post 2116 onto the first stud/collector disk 2114.

Next, the second stud/collector disk/terminal post 2120 is aligned with the second end of the hollow core 2160. The second stud/collector disk/terminal post 2120 includes a stud portion 2140, a disk-shaped portion 2142 (or collector disk portion 2142), and a terminal post portion 2144 (or second terminal post 2144). The stud portion 2140 of the second stud/collector disk/terminal post 2120 is inserted into an opening at a second end of the hollow core 2160, and the collector disk portion 2142 of the second stud/collector disk/terminal post 2120 is seated against the second end of the "jellyroll" electrode assembly 2108 including the first and second aluminum regions (similar to those shown in FIG. 12) and second contact edge 2112 of the second end of the "jellyroll" electrode assembly 2108. The collector disk portion 2142 of the second stud/collector disk/terminal post 2120 is laser welded to the second end of the "jellyroll" electrode assembly 2108 including the first and second aluminum regions and the second contact edge 2112 of the second end of the "jellyroll" electrode assembly 2108.

The can 2122 is then slid over the "jellyroll" electrode assembly 2108 so that the second stud/collector disk/ terminal post 2120 enters the can 2122 first, and passes through the first insulating washer 2124. The first insulating washer 2124 may be made from Tefzel. Next, the second stud/collector disk/terminal post 2120 passes through an axial hole at an end of the can 2122 and through the second insulating washer 2126. The second insulating washer 2126 may also be made from Tefzel.

The second stud/collector disk/terminal post 2120 next passes through the flat washer 2128 and the Belleville washer 2130. The locknut 2132 is then tightened over the Belleville washer 2130, which compresses the Belleville washer 2130 against the flat washer 2128, which in turn is compressed against the second insulating washer 2126. The second insulating washer 2126 is compressed against the exterior periphery of the axial hole in the can 2122, and as the second stud/collector disk/terminal post 2120 is drawn by this compressive force toward the axial hole, the first insulating washer 2124 is compressed between the second stud/collector disk/terminal post 2120 and an interior periphery of the axial hole in the can 2122. A flange on the first insulating washer 2124 prevents electrical contact between the second stud/collector disk/terminal post 2120 and a rim of the axial hole.

Simultaneously, the lid 2118 is drawn into an opening of the can 2122, so that a rim of the lid 2118 sits just inside a lip of the opening of the can 2122. The rim of the lid 2118 is then welded to the lip of the opening of the can 2122.

Once the locknut 2132 is tightened against the Belleville washer 2130, a hermetic seal is formed between the axial hole, the first insulating washer 2124, the second insulating washer 2126, and the second stud/collector disk/terminal post 2120.

Similarly, the welding of the lid 2118 to the lip of the can 2122, and the welding of the lid 2118 to the first terminal post 2116 form another hermetic seal.

The hole 2146 in the lid 2118 remains and serves as a fill port for an electrolyte solution, which may be made up of a solvent and a salt, as described above. Once the electrolyte solution is in the can (i.e., drawn into the can under vacuum, as described above), a bushing 2148 is then placed into the hole 2146, and is seated against a flange 2150 at an interior edge of the hole 2146. The bushing 2148 is a hollow cylinder in shape, fashioned to receive a plug 2152.

The plug 2152, which is cylindrical in shape, is next pressed into a center of the bushing 2148, thereby compressing the bushing 2148 against an interior of the hole 2146 and forming a hermetic seal between the hole 2146, the bushing 2148, and the plug 2152.

The plug 2152 and the bushing 2148 may be selected to dislodge when a prescribed level of pressure is reached within the electrochemical double layer capacitor, thereby forming an overpressure safety mechanism.

Figure 22:
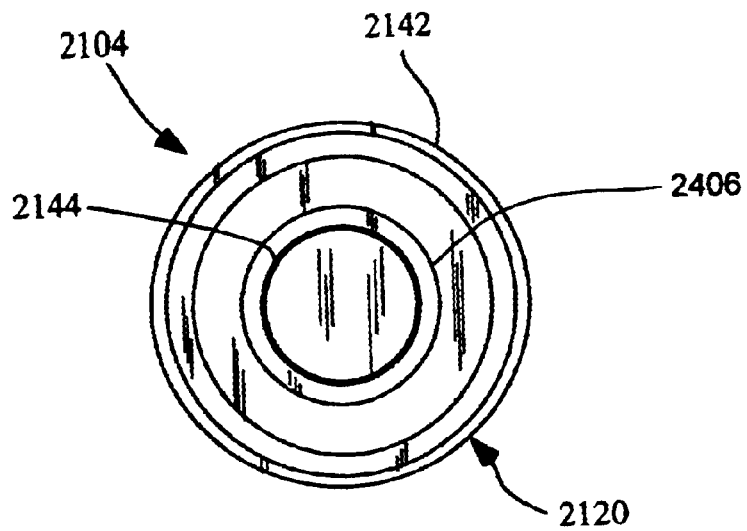
FIG. 22 is a top view of a stud/collector disk/terminal post of the second terminal of the variation of FIG. 21.

FIG. 22 is a top view of a second stud/collector disk/terminal post 2120 of the second terminal assembly 2104 of the variation of FIG. 21.

Shown are a collector disk portion 2142, a threaded portion 2406, and a terminal post portion 2144. The terminal post portion 2144 includes a threaded portion for engaging the locknut 2132 (FIG. 21), and thereby allowing the locknut 2132 (FIG. 21) to be tightened down onto the terminal post portion 2144 during assembly as described above.

Advantageously by forming the stud portion 2140 (FIG. 21), the collector disk portion 2142, and the terminal post portion 2144 in a single unit, the assembly steps and the number of pieces required to construct the electrochemical double layer capacitor of the present embodiment are reduced, thereby reducing cost and complexity.

Figure 23:
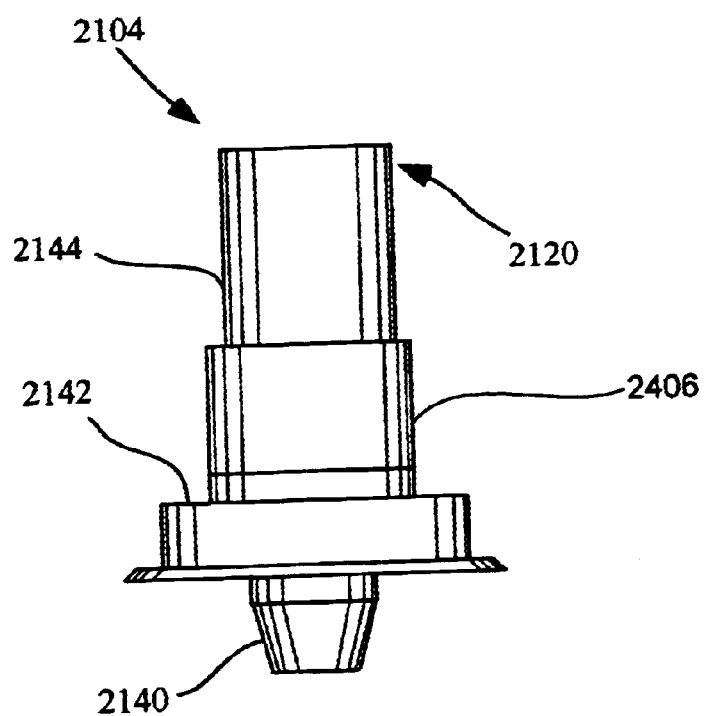
FIG. 23 is a side view of a stud/collector disk/terminal post such as in FIG. 22 of the second terminal of the variation of FIG. 21.

FIG. 23 is a side view of a stud/collector disk/terminal post 2120 of the second terminal assembly 2104 of the variation of FIG. 21.

Shown are a stud portion 2140, the threaded portion 2406, a collector disk portion 2142, and a terminal post portion 2144. The terminal post portion 2144 includes a threaded portion for engaging the locknut 2132 (FIG. 21), and thereby allowing the locknut 2132 (FIG. 21) to be tightened down onto the terminal post portion 2144 during assembly as described above.

Figure 24:
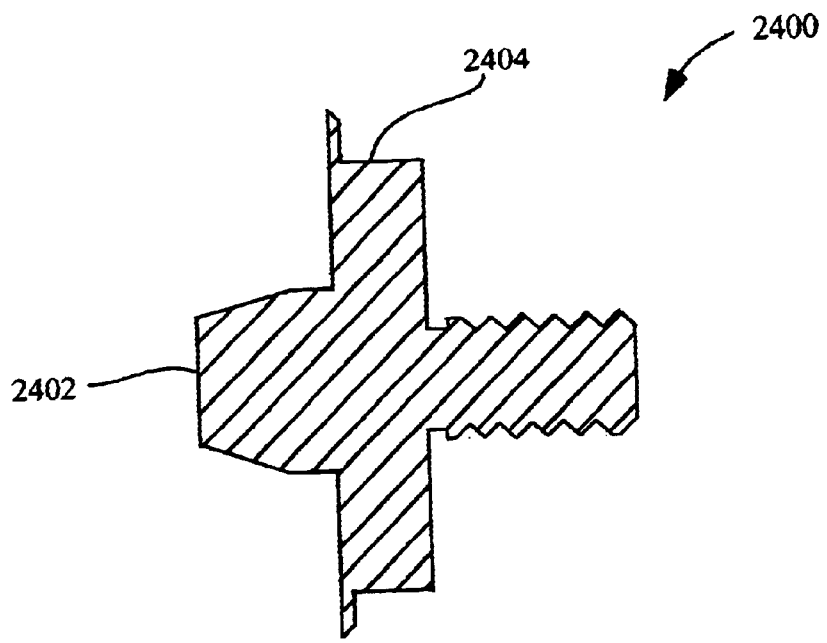
FIG. 24 is a side view of a stud/collector disk of the first terminal of the variation of FIG. 21.

FIG. 24 is a side view of a stud/collector disk 2400 of the first terminal of the variation of FIG. 21.

Shown are a stud portion 2402 (also shown as the stud portion 2136 in FIG. 21), a collector disk portion 2404 (also shown as the collector disk portion 2134 in FIG. 21), and a threaded portion 2406. The threaded portion 2406 is inserted into a threaded hole in the first terminal post (not shown) during assembly, as described above.

Figure 25:
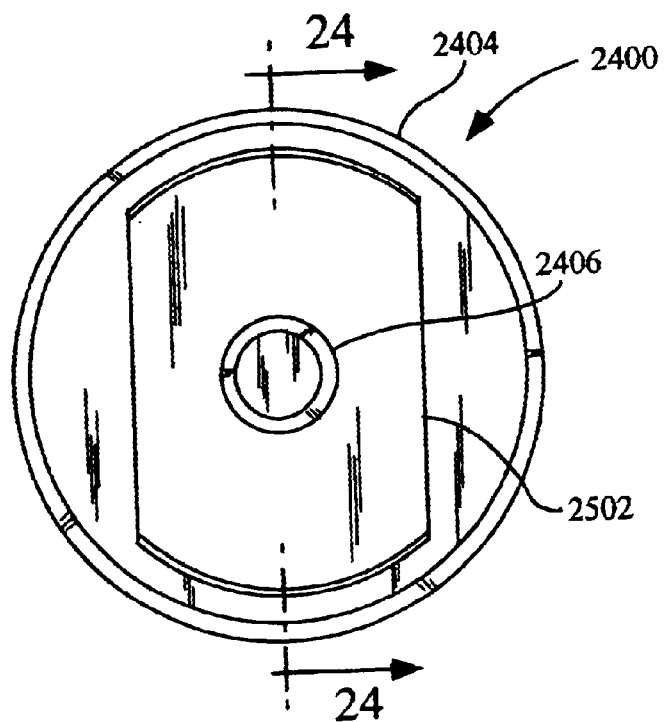
FIG. 25 is a top view of a stud/collector disk of the first terminal of the variation of FIG. 21.

FIG. 25 is a top view of a stud/collector disk 2400 of the first terminal of the variation of FIG. 21.

Shown are the collector disk portion 2404 and the threaded portion 2406 along with a notched cylindrical portion 2502. The notched cylindrical portion 2502 is used to apply a rotational force to the threaded portion 2406 as the threaded portion is assembled with the first terminal post (not shown), such as by using a tool that engages flat surfaces of notches in the notched cylindrical portion 2502. The notches in the notched cylindrical portion 2502 do not affect the surface area of the collector disk that contacts the second electrode at the second end of the "jellyroll."

Referring to FIG. 26, a side cross-sectional view is shown of another variation of the "jellyroll" embodiment of FIGS. 12 through 20, employing a pocket 2602 in the can in a modified second electrode assembly.

Shown are the "jellyroll" electrode assembly 1200 of FIG. 13, a first collector disk 1404, a first terminal post 1504, a lid 2606, a first insulating washer 1702, a second insulating washer 1802, a flat washer 1804, a Belleville washer 1806, a locknut 1808, a hole 1902 in the lid 2606, a second collector disk 1604, second terminal post 1504, a can 2604, and the pocket 2602 in the can 2604.

The "jellyroll" electrode assembly 1200 is prepared in accordance with the process described above, and the first and second collector disks 1404, 1604, and the first and second terminal posts 1504, 1606 are affixed to the "jellyroll" electrode assembly 1200, such as by laser welding or arc spraying, as described above. Next, the "jellyroll" electrode assembly 1200, with the respective first and second collector disks 1404, 1604, and first and second terminal posts 1504, 1606, is slid into the can 2604 (with the second terminal post 1606 entering the can 2604 first). The second terminal post 1604 seats in an interior of the pocket 2602 in the can 2604 as the "jellyroll" electrode assembly 1200 is slid into the can 2604, and the pocket 2602 is crimped against the second terminal post 1606, so as to electrically and mechanically connect the second terminal post 1606 to the interior of the pocket 2602. An exterior of the pocket serves as a first terminal of the electrochemical double layer capacitor 1200.

Next, the first insulating washer 1702 is slid over the first terminal post 1504, and then the lid 2606 is inserted into the can 2604 over the first terminal post 1504. A rim of the lid 2606 is welded to a lip of the can 2604, as described above, so as to form a hermetic seal. The second insulating washer 1802, the flat washer 1804, and the Belleville washer 1806 are slid over the first terminal post 1504, and the locknut 1808 is tightened down onto the Belleville washer 1806, so as to form a further hermetic seal.

The electrolyte solution is then introduced into the can through the hole 1902 in the lid, as described above, and the bushing (not shown), and plug (not shown) are used to form a hermetic seal at the hole 1902 in the lid.

Referring to FIG. 27, a side cross-sectional view is shown of another variation of the "jellyroll" embodiment of FIGS.

12 through 20, employing a crimp seal to secure a crimp lid 2702 to the can 2604, and employing a pocket 2704 in the lid 2702 in a modified first electrode assembly.

Shown are the "jellyroll" electrode assembly 1200 of FIG. 13, a first collector disk 1404, a first terminal post 1504, a crimp lid 2702, a second collector disk 1604, a second terminal post 1606, a can 2604, and a pocket 2602 in the can 2604, and a pocket 2704 in the crimp lid 2702.

The "jellyroll" electrode assembly 1200 in prepared in accordance with the process described above, and the first and second collector disks 1404, 1604, and the first and second terminal posts 1504, 1606 are affixed to the "jellyroll" electrode assembly 1200, such as by laser welding or arc spraying, as described above. Next, the "jellyroll" electrode assembly 1200, with the respective first and second collector disks 1404, 1604, and first and second terminal posts 1504, 1606, is slid into the can 2604 (with the second terminal post 1606 entering the can 2604 first). The second terminal post 1606 seats in an interior of the pocket 2602 in the can 2604 as the "jellyroll" electrode assembly 1200 is slid into the can 2604, and the pocket 2602 in the can 2604 is crimped against the second terminal post 1606, so as to electrically and mechanically connect the second terminal post 1606 to the interior of the pocket 2602. An exterior of the pocket serves as a second terminal of the electrochemical double layer capacitor.

Next, the electrolyte solution is introduced into the can, as described above.

Then, a seal 2706 is placed onto a lip of the can 2604, and the crimp lid 2702 is placed into the opening of the can 2604, with a rim of the crimp lid 2702 engaging the seal 2706. The first terminal post 1504 seats in an interior of the pocket 2704 in the crimp lid 2702 as the crimp lid 2702 is placed into the opening of the can 2604.

The lip of the can 2604 is crimped onto the rim of the crimp lid 2704, with the seal 2706 being interposed thereinbetween, so as to form a hermetic seal between the crimp lid 2704 and the can 2604.

An interior of the pocket 2704 in the crimp lid 2702 is then crimped against the first terminal post 1504, so as to electrically and mechanically connect the first terminal post 1504 to the pocket 2704 in the crimp lid 2702. An exterior of the pocket 2704 in the crimp lid 2702 serves as a first terminal of the electrochemical double layer capacitor.

Referring to FIG. 28, a side cross-sectional view is shown of another variation of the "jellyroll" embodiment of FIGS. 12 through 20, employing a low profile "can-within-a-can" assembly and modified first and second electrode assemblies.

Shown are the "jellyroll" electrode assembly 1200 of FIG. 13, a first collector disk 1404, a first terminal post 1504, a second collector disk 1604, a second terminal post 1606, an inner can 2802, an outer can 2804, a pocket 2806 in the inner can 2802, and a pocket 2808 in the outer can 2804.

The "jellyroll" electrode assembly 1200 is prepared in accordance with the process described above, and the first and second collector disks 1404, 1604, and the first and second terminal posts 1504, 1606 are affixed to the "jellyroll" electrode assembly 1200, such as by laser welding or arc spraying, as described above.

A seal 2810 is then placed at a periphery of an interior basal end of the outer can 2804.

Next, the "jellyroll" electrode assembly 1200, with the respective first and second collector disks 1404, 1604, and first and second terminal posts 1504, 1606, is slid into the outer can 2804 (with the second terminal post 1606 entering the outer can 2804 first). The second terminal post 1606 seats in an interior of the pocket 2808 in the outer can 2804 as the "jellyroll" electrode assembly 1200 is slid into the outer can 2804, and the pocket 2808 is crimped against the second terminal post 1606, so as to electrically and mechanically connect the second terminal post 1606 to the pocket 2808 in the outer can 2804. An exterior of the pocket serves as a second terminal of the electrochemical double layer capacitor.

The inner can 2802 is then slid into the outer can 2804, with a lip of the inner can 2802 engaging the seal 2810 at the periphery of the interior basal end of the outer can 2804. As the inner can 2802 is slid into the outer can 2804, an interior of the pocket 2806 in the inner can 2802 engages the first terminal post 1504.

A lip of the outer can 2804 is then crimped against a periphery of an exterior basal end of the inner can 2802, so as to form a hermetic seal at the periphery of the interior basal end of the outer can 2804, and the lip of the inner can 2802, with the seal 2810.

The pocket 2806 in the inner can 2802 is then crimped against the first terminal post 1504, so as to electrically and mechanically connect the first terminal post 1504 to the pocket 2806 in the inner can 2802. An exterior of the pocket 2806 in the inner can 2802 serves as a first terminal of the electrochemical double layer capacitor.

The electrolyte solution is then introduced into the inner and outer cans 2802, 2804 through a hole 2812 in the end of the outer can 2804, and a bushing (not shown), and plug (not shown) are used to form a hermetic seal at the hole 1812 in the outer can 1804, as described above.

Referring to FIG. 29, a side cross-sectional view is shown of another variation of the "jellyroll" embodiment of FIGS. 12 through 20, employing a ceramic seal 2902 between the lid 2904 and the first terminal assembly.

Shown are the "jellyroll" electrode assembly 1200 of FIG. 13, a first collector disk 1404, a first terminal post 1504, a lid 2904, a ceramic seal 2902, a second collector disk 1604, a second terminal post 1606, a can 2604, and a pocket 2602 in the can 2604.

The "jellyroll" electrode assembly 1200 is prepared in accordance with the process described above.

Next, the ceramic seal 2902 is bonded to the first terminal post 1504, and the lid 2904 is bonded to the ceramic seal 2902, such as by diffusion bonding, so as to form a hermetic, insulating seal between the ceramic seal 2902 and the first terminal post 1404, and between the ceramic seal 2902 and the lid 2904.

Then, the first and second collector disks 1404, 1604, and the first and second terminal posts 1504, 1606 are affixed to the "jellyroll" electrode assembly 1200, such as by laser welding or arc spraying, as described above.

Next, the "jellyroll" electrode assembly 1200, with the respective first and second collector disks 1404, 1604, and first and second terminal posts 1504, 1606, is slid into the can 2604 (with the second terminal post 1606 entering the can 2604 first). The second terminal post 1606 seats in an interior of the pocket 2602 in the can 2604 as the "jellyroll" electrode assembly 1200 is slid into the can 2604, and the pocket is crimped against the second terminal post 1606, so as to electrically and mechanically connect the second terminal post 1606 to the pocket 2602. An exterior of the pocket serves as a second terminal of the electrochemical double layer capacitor.

A rim of the lid 2904 is welded to a lip of the can 2604, as described above, so as to form a hermetic seal.

The electrolyte solution is then introduced into the can 2604 through a hole (not shown) in the lid 2904, and a bushing (not shown), and plug (not shown) are used to form a hermetic seal at the bole (not shown) in the can 2604, as described above.

While the invention herein disclosed has been described by the specific embodiments and applications thereof, numerous modifications and variations could be made thereto by those skilled in the art without departing from the scope of the invention set forth in the claims.

What is claimed is:

1. An electrode structure for use in a double layer capacitor comprising:
    a rolled electrode stack comprising:
        a plurality of electrodes, each of the plurality of electrodes comprising:
            a current collector foil;
            a primary coating formed on a portion of each side of the current collector foil, the primary coating including conducting carbon powder and a binder; and
            a secondary coating formed on each primary coating, the secondary coating including activated carbon powder, a solvent and a binder;
        wherein a first set of the plurality of electrodes comprises a respective current collector foil having portions without the primary coating formed thereon that extend from an end of the rolled structure and a second set of the plurality of electrodes comprises another respective current collector foil having portions without the primary coating formed thereon that extend from another end of the rolled structure;
        wherein portions of the current collector foils extending from each end of the rolled electrode stack are smeared together into electrical contact with each other;
        a respective separator positioned between each of the plurality of electrodes in a stack such that the respective separator is juxtaposed against respective secondary coatings of adjacent ones of the plurality of electrodes, wherein the respective separator electrically insulates the adjacent ones of the plurality of electrodes from each other,
        wherein the electrode stack is rolled starting at one end of the electrode stack into a cylindrical structure to form the rolled electrode stack.

2. The structure of claim 1 wherein the portions of the respective current collector foil without the primary coating formed thereon that extend from the end of the rolled structure are smeared together to form a first terminal.

3. The structure of claim 2 wherein the portions of the other respective current collector foil without the primary coating formed thereon that extend from the other end of the rolled structure are smeared together to form a second terminal.

4. The structure of claim 1 further comprising a conductive coating applied to a portion of the current collector foils smeared together at each end of the rolled electrode stack, each conductive coating adapted to be coupled to a respective capacitor terminal.

5. A double layer capacitor comprising:
    a capacitor can having a first terminal and a second terminal;
    a rolled electrode structure contained within the capacitor can, the rolled electrode structure comprising:
        a plurality of electrodes, each of the plurality of electrodes comprising:
            a current collector foil;
            a primary coating formed on a portion of each side of the current collector foil, the primary coating including conducting carbon powder and a binder; and
            a secondary coating formed on each primary coating, the secondary coating including activated carbon powder, a solvent and a binder;
        wherein a first set of the plurality of electrodes comprises a respective current collector foil having portions without the primary coating formed thereon that extend from an end of the rolled structure and a second set of the plurality of electrodes comprises another respective current collector foil having portions without the primary coating formed thereon that extend from another end of the rolled structure;
        wherein portions of the current collector foils extending from each end of the rolled electrode stack are smeared together into electrical contact with each other;
        a respective separator positioned between each of the plurality of electrodes in a stack such that the respective separator is juxtaposed against respective secondary coatings of adjacent ones of the plurality of electrodes, wherein the respective separator electrically insulates the adjacent ones of the plurality of electrodes from each other, wherein the electrode stack is rolled starting at one end of the electrode stack into a cylindrical structure to form the rolled electrode structure; and
    an electrolytic solution contained within the capacitor can.

6. The double layer capacitor of claim 5 wherein the portions of the respective current collector foil without the primary coating formed thereon that extend from the end of the rolled structure are smeared together to form a first terminal.

7. The double layer capacitor claim 6 wherein the portions of the other respective current collector foil without the primary coating formed thereon that extend from the other end of the rolled structure are smeared together to form a second terminal.

8. The double layer capacitor of claim 5 further comprising a conductive coating applied to a portion of the current collector foils smeared together at each end of the rolled electrode stack, each conductive coating adapted to be coupled to a respective capacitor terminal.

9. An electrode structure for use in a double layer capacitor, comprising:
    a plurality of electrodes, each of the plurality of electrodes comprising:
        a current collector plate having a length and a width and a thickness;
        a primary coating formed on a portion of each side of the current collector plate, the portion covering an area extending the length of the current collector plate and extending a portion of the width of the current collector plate, the primary coating including conducting carbon powder and a binder; and
        a secondary coating formed on each primary coating, the secondary coating including activated carbon powder, a solvent and a binder;
    a respective separator positioned between each of the plurality of electrodes wherein the respective separator is interposed between respective secondary coatings of adjacent ones of the plurality of electrodes, wherein the respective separator electrically insulates the adjacent ones of the plurality of electrodes from each other, thereby forming an electrode stack with a respective separator positioned in between respective ones of the plurality of electrodes, the electrode stack having a stack length and a stack width; and wherein a first set of the plurality of electrodes comprise respective current collector plates having a portion without the primary coating formed thereon that extends from an end of the rolled structure and a second set of the plurality of electrodes comprise respective current collector plates having a portion without the primary coating formed thereon that extends from another end of the rolled structure to form the electrode structure wherein the stack width is greater than the width;

wherein the electrode stack is rolled starting at one end of the electrode stack along the stack length into a rolled structure.

10. The electrode structure of claim 9 wherein the respective portions of respective current collector plates in each of the first set of electrodes that do not have the respective primary coating formed thereon are electrically coupled together to form a first terminal.

11. The electrode structure of claim 10 wherein the respective current collector plates in each of the second set of electrodes that do not have the respective primary coating formed thereon are electrically coupled together to form a second terminal.

12. The electrode structure of claim 11 wherein the first terminal and the second terminal are positioned at opposite ends of the rolled structure and are adapted to coupled with a first and a second terminal post respectively wherein the first and second terminal posts extend from opposite ends of a can.

13. An electrode structure for use in a double layer capacitor comprising:
    a rolled electrode stack comprising:
        a plurality of electrodes, each of the plurality of electrodes comprising:
            a current collector foil; and
            a layer comprising activated carbon electrically coupled to the current collector foil;
        wherein a first set of the plurality of electrodes comprises current collector foils extending from one end of the rolled electrode stack and a second set of the plurality of electrodes comprises current collector foils that extend from another end of the rolled electrode stack;
        wherein respective portions of the current collector foils in the first and second sets of the plurality of electrodes extending from the ends of the rolled electrode stack are smeared together into electrical contact with each other;
    a respective separator positioned between each of the plurality of electrodes in a stack such that the respective separator is juxtaposed against respective activated carbon layers of adjacent ones of the plurality of electrodes, wherein the respective separator electrically insulates the adjacent ones of the plurality of electrodes from each other, wherein the electrode stack is rolled starting at one end of the electrode stack into a cylindrical structure to form the rolled electrode stack.

14. The structure of claim 13 further comprising a conductive coating applied to a portion of the current collector foils smeared together at each end of the rolled electrode stack, each conductive coating adapted to be coupled to a respective capacitor terminal.

15. The structure of claim 13 wherein the current collector foils extending from the one end of the rolled electrode stack form a first terminal and the current collector foils that extend from the other end of the rolled electrode stack form a second terminal.

16. The structure of claim 13 wherein the respective portions of the current collector foils in the first and second sets of the plurality of electrodes extending from the ends of the rolled electrode stack that are smeared together are not covered by respective layers comprising activated carbon.

17. The structure of claim 13 wherein the respective portions of the current collector foils in the first and second sets of the plurality of electrodes extending from the ends of the rolled electrode stack are smeared together by application of an axial pressure against the respective portions of the current collector foils.

18. The structure of claim 13 wherein the respective portions of the current collector foils in the first and second sets of the plurality of electrodes extending from the ends of the rolled electrode stack are smeared together by application of a radial pressure against the respective portions of the current collector foils.

* * * * *